United States Patent [19]
Falls et al.

[11] Patent Number: 5,991,771
[45] Date of Patent: Nov. 23, 1999

[54] TRANSACTION SYNCHRONIZATION IN A DISCONNECTABLE COMPUTER AND NETWORK

[75] Inventors: Patrick T. Falls, Newbury; Brian J. Collins, New Malden; Stephen P. W. Draper, Basingstoke, all of United Kingdom

[73] Assignee: Novell, Inc., Provo, Utah

[21] Appl. No.: 08/700,487

[22] PCT Filed: Jul. 18, 1996

[86] PCT No.: PCT/US96/11901

§ 371 Date: Jul. 3, 1997

§ 102(e) Date: Jul. 3, 1997

[87] PCT Pub. No.: WO97/04389

PCT Pub. Date: Feb. 6, 1997

Related U.S. Application Data
[60] Provisional application No. 60/001,261, Jul. 20, 1995.

[51] Int. Cl.$^6$ .................................................. G06F 17/00
[52] U.S. Cl. ...................... 707/202; 707/201; 395/182.1; 395/182.13
[58] Field of Search .................. 707/8, 10, 201, 707/203, 200, 202; 395/180, 182.1, 182.13

[56] References Cited

U.S. PATENT DOCUMENTS

| | | | |
|---|---|---|---|
| 4,575,793 | 3/1986 | Morel et al. | 364/200 |
| 4,622,631 | 11/1986 | Frank et al. | 364/200 |
| 4,774,655 | 9/1988 | Kollin et al. | 364/200 |
| 4,774,661 | 9/1988 | Kumpati | 364/300 |
| 4,827,399 | 5/1989 | Shibayama | 364/200 |
| 4,878,167 | 10/1989 | Kapulka et al. | 364/200 |
| 4,941,845 | 7/1990 | Eppley et al. | 439/505 |
| 5,001,628 | 3/1991 | Johnson et al. | 364/200 |
| 5,008,814 | 4/1991 | Mathur | 364/200 |
| 5,019,963 | 5/1991 | Alderson et al. | 364/200 |
| 5,043,876 | 8/1991 | Terry | 364/200 |

(List continued on next page.)

FOREIGN PATENT DOCUMENTS

| | | | |
|---|---|---|---|
| 87107475 | 1/1988 | European Pat. Off. | G06F 11/14 |
| 92308720 | 8/1993 | European Pat. Off. | G06F 15/16 |
| 9508809 | 3/1995 | European Pat. Off. | G05F 17/30 |
| 95100255 | 7/1995 | European Pat. Off. | G06F 17/30 |

OTHER PUBLICATIONS

Advance Program—Second Workshop on the Management of Replicated Data (WMRD–II), Nov. 12–13, 1992, pp. 1–2.

"Application–Aware Adaptation for Mobile Computing", M. Satyanarayanan et al., *ACM SIGOS Operating Systems Review 29.1*, 1995, pp. 52–55.

"Architecture of the Ficus Scalable Replicated File System", T. Page, Jr., *Computer Science Department Technical Report University Of California At Los Angeles*, Mar. 1991, pp. 1–18.

"Coda: A Highly Available file System for a Distributed Workstation Environment", M. Satyanarayanan et al., *IEEE Transactions On Computers*, vol. 39 No. 4 Apr. 1990, pp. 447–459.

"Coding for Compression in Full–Text Retrieval Systems", A. Moffat et al., *IEEE DCC Data Compression Conference*, 1992, pp. 72–81.

(List continued on next page.)

*Primary Examiner*—Paul V. Kulik
*Attorney, Agent, or Firm*—Computer Law

[57] ABSTRACT

A method and apparatus are disclosed for synchronizing transactions in a disconnectable network. Each transaction includes operations that were performed on a database replica on one computer while that computer was disconnected from another computer and hence from that other computer's replica. Transaction synchronization, which occurs after the computers are reconnected, transfers information from each computer to the other computer and applies updates to both replicas as appropriate. Transaction logs and clash handling tools may be used with the invention.

34 Claims, 4 Drawing Sheets

U.S. PATENT DOCUMENTS

| | | | |
|---|---|---|---|
| 5,113,519 | 5/1992 | Johnson et al. | 395/600 |
| 5,142,680 | 8/1992 | Ottman et al. | 395/700 |
| 5,146,561 | 9/1992 | Carey et al. | 395/200 |
| 5,151,989 | 9/1992 | Johnson et al. | 395/600 |
| 5,155,847 | 10/1992 | Kirouac et al. | 395/600 |
| 5,159,669 | 10/1992 | Trigg et al. | 395/159 |
| 5,170,480 | 12/1992 | Mohan et al. | 395/600 |
| 5,185,857 | 2/1993 | Rozmanith et al. | 395/148 |
| 5,212,789 | 5/1993 | Rago | 395/600 |
| 5,229,768 | 7/1993 | Thomas | 341/51 |
| 5,237,680 | 8/1993 | Adams et al. | 395/600 |
| 5,247,683 | 9/1993 | Holmes et al. | 395/700 |
| 5,274,803 | 12/1993 | Dubin et al. | 395/600 |
| 5,276,868 | 1/1994 | Poole | 395/600 |
| 5,276,871 | 1/1994 | Howarth | 395/600 |
| 5,276,876 | 1/1994 | Coleman et al. | 395/650 |
| 5,278,979 | 1/1994 | Foster et al. | 395/600 |
| 5,278,982 | 1/1994 | Daniels et al. | 395/600 |
| 5,291,591 | 3/1994 | Kawano et al. | 395/600 |
| 5,297,278 | 3/1994 | Wang et al. | 395/600 |
| 5,313,646 | 5/1994 | Hendricks et al. | 395/600 |
| 5,317,728 | 5/1994 | Tevis et al. | 395/600 |
| 5,321,832 | 6/1994 | Tanaka et al. | 395/600 |
| 5,325,524 | 6/1994 | Black et al. | 395/600 |
| 5,333,315 | 7/1994 | Saether et al. | 395/600 |
| 5,347,653 | 9/1994 | Flynn et al. | 395/600 |
| 5,355,476 | 10/1994 | Fukumara | 395/600 |
| 5,375,207 | 12/1994 | Blakely et al. | 395/200 |
| 5,377,326 | 12/1994 | Murata et al. | 395/600 |
| 5,388,256 | 2/1995 | Herbert | 395/600 |
| 5,390,335 | 2/1995 | Stephan et al. | 395/800 |
| 5,403,639 | 4/1995 | Belsan et al. | 395/600 |
| 5,408,619 | 4/1995 | Oran | 395/325 |
| 5,410,543 | 4/1995 | Seitz et al. | 370/85.13 |
| 5,410,684 | 4/1995 | Ainsworth et al. | 395/575 |
| 5,412,801 | 5/1995 | de Remer et al. | 395/575 |
| 5,418,957 | 5/1995 | Narayan | 395/700 |
| 5,423,034 | 6/1995 | Cohen-Levy et al. | 395/600 |
| 5,430,871 | 7/1995 | Jamoussi et al. | 395/600 |
| 5,434,994 | 7/1995 | Shaheen et al. | 395/500 |
| 5,452,450 | 9/1995 | Delory | 395/600 |
| 5,553,279 | 9/1996 | Goldring | 395/600 |
| 5,588,147 | 12/1996 | Neeman et al. | 395/601 |
| 5,613,113 | 3/1997 | Goldring | 395/618 |
| 5,666,530 | 9/1997 | Clark et al. | 395/617 |
| 5,684,984 | 11/1997 | Jones et al. | 395/610 |
| 5,692,129 | 11/1997 | Sonderegger et al. | 395/200.11 |
| 5,710,922 | 1/1998 | Alley et al. | 395/617 |
| 5,737,600 | 4/1998 | Geiner et al. | 395/616 |
| 5,737,601 | 4/1998 | Jain et al. | 395/617 |
| 5,740,433 | 4/1998 | Carr et al. | 395/618 |
| 5,761,660 | 6/1998 | Josten et al. | 707/8 |
| 5,774,717 | 6/1998 | Porcaro | 707/202 |
| 5,778,390 | 7/1998 | Nelson et al. | 707/204 |
| 5,806,075 | 9/1998 | Jain et al. | 707/201 |
| 5,832,518 | 11/1998 | Mastors | 707/202 |
| 5,878,434 | 3/1999 | Draper et al. | 707/202 |

OTHER PUBLICATIONS

"A compact representation for file versions: a preliminary report", A. Black et al., *5th IEEE Conference On Data Engineering*, 1989, pp. 321–329.

"Concurrency Control and Consistency of Multiple Copies of Data in Distributed INGRES", M. Stonebraker, *IEEE Transactions On Software Engineering*, vol. SE–5, No. 3, May 1979, pp. 188–194.

"Conflict Detection Tradeoffs for Replicated Data", M. Carey et al., *ACM Transactions on Database Systems*, vol. 16, No. 4, Dec. 1991, pp. 703–746.

"Countdown to Mobile Blast–Off", I. Brodsky, *Network World*, Feb. 19, 1996, pp. 44–46,52.

"Data Management for Mobile Computing", T. Imielinski et al., *ACM SIGMOD Record*, vol. 22, No. 1, Mar. 1993, pp. 34–39.

"Data Replicas in Distributed Information Services", H. Gladney, *ACM Transactions on Database Systems*, vol. 14, No. 1, Mar. 1989, pp. 75–97.

"Database System Issues in Nomadic Computing", R. Alonso et al., *ACM SIGMOD Record*, 22 2, 1993, pp. 388–392.

"DGDBM: Programming Support for Distributed Transactions Over Replicated Files", M. Franky, *ACM SIGOS Operating Systems Review*, 29 3, Jul. 1995, pp. 64–74.

"Disconnected Operation for AFS", L. Huston et al., Mobile and Location—Independent Computing Symposium, USENIX Association, 1994, pp. 1–10.

"Disconnected Operation in the Coda File System", J. Kistler et al., *ACM Operating Systems Review*, 25 5, 1991, pp. 213–225.

"Disconnected Operation in a Distributed File System", J. Kistler, Ph.D. thesis, Department of Computer Science, Carnegie Mellon University, May 1993, pp. 1–186.

"Discord in hardwareland", T. Schmidt, *Network World*, Feb. 19. 1996, p. 47.

"Distributed Logging for Transaction Processing", D. Daniels et al., *ACM*, 1987, pp. 82–96.

"Experience with Disconnected Operation in a Mobile Computing Environment", M. Satyanarayanan et al., *Mobile and Location–Independent Computing Symposium*, 1994, pp. 11–28.

"Fixed Length Semiorder Preserving Code for Field Level Data File Compression", M. Toyama et al., *IEEE—First International Conference on Data Engineering*, 1984, pp. 244–252.

"Flexible and Safe Resolution of File Conflicts", P. Kumar et al., *1995 UESNIX Technical Conference*, Jan. 16–20, 1995, pp. 95–106.

"The Generalized Tree Quorum Protocol: An Efficient Approach for Managing Replicated Data", D. Agrawal et al., *ACM Transactions on Database Systems*, vol. 17, No. 4, Dec. 1992, pp. 689–717.

"A Generic Multicast Transport Service to Support Disconnected Operation", S. Maffeis et al., *Mobile and Location-–Independent Computing Symposium*, 1995, pp. 79–89.

"Getting Your Byte's Worth", S. Vaughan–Nichols, *Byte*, Nov. 1990, pp. 331–336.

"Grapevine: An Exercise in Distributed Computing—Abstract", A. Birrell et al., *Communications of the ACM*, vol. 25, No. 4, Apr. 1982, pp. 260–261.

"Going Mobile", S. Biagi, *Network Var*, Apr. 1996, p. 14.

"Impact of Mobility on Distributed Computations", B. Badrinath et al., *ACM SIGOS Operating Systems Review*, 27 2, 1993, pp. 15–20.

"An Introduction to Database Systems vol. II", C. Date, Addison–Wesley Publidhing Company, 1993, pp. 1–33, 291–340.

"Isolation–Only Transactions for Mobile Computing", Q. Lu et al., *ACM SIGOS Operating Systems Review*, 28 2, 1994, pp. 81–87.

"Log–Based Directory Resolution in the Coda File System", P. Kumar et al., *IEEE*, 1993, pp. 202–213.

"The Lotus Notes™ Storage System", K. Moore, *ACM SIGMOD Record*, 24 2, 1995, pp. 427–428.

"Low Cost Management of Replicated Data in Fault–Tolerant Distributed Systems", T. Joseph et al., *ACM Transactions on Computer Systems*, vol. 4, No. 1, Feb. 1986, pp. 54–70.

"Maintaining Availability in Partitioned Replicated Databases", A. Abbadi et al., *ACM Transactions on Computer Systems*, vol. 14, No. 2, Jun. 1989, pp. 264–290.

"Model Based Concordance Compression", A. Bookstein et al., *IEEE DCC Data Compression Conference*, 1992, pp. 82–91.

"The Multicast Policy and Its Relationship to Replicated Data Placement", O. Wolfson et al., *ACM Transactions on Database Systems*, vol. 16, No. 1, Mar. 1991, pp. 181–205.

"A Multi–Group Technique for Data Compression", K. Hazboun et al., *ACM SIGMOD Conference*, 1982, pp. 284–292.

"NetWare 4 for Professionals", D. Bierer et al., *New Riders Publishing*, 1993, pp. 359–374.

"A Non–Blocking Transaction Data Flow Graph Based Approach For Replicated Data", P. Krishna Reddy et al., *Operating Systems Review (SIGOPS) 27 No. 3*, Jul. 1993, pp. 46–54.

"Partially Connected Operation", L. Huston et al., *Mobile and Location–Independent Computing Symposium*, 1995, pp. 91–97.

"Peephole Log Optimization", L. Huston et al., *IEEE Workshop on Mobile Computing Systems and Applications*, Dec. 1994, pp. 1–8.

"Performing Remote Operations Efficiently on a Local Computer Network", A. Spector, *Communications of the ACM*, vol. 25, No. 4, Apr. 1982, pp. 246–259.

"Primarily Disconnected Operation: Experiences with Ficus", J. Heidemann et al., *IEEE*, 1992, pp. 2–5.

"Replicated Data in a Distributed Environment", M. Colton, *ACM SIGMOD Record*, 22 2, 1993, pp. 464–466.

"Remote access can't slow down", H. Allard, *Network World*, Feb. 19, 1996, p. 53.

"A Replicated UNIX File System (Extended Abstract)", B. Liskov et al., *ACM SIGOS Operating Systems Review*, 25 1, 1991, pp. 60–64.

"Replication in the Harp File System", B. Liskov, *ACM Operating Systems Review*, 25 5, 1991, pp. 226–238.

"Resolving File Conflicts In The Ficus File System", P. Reiher et al., *1994 Summer Usenix*, Jun. 6–10, 1994, pp. 183–195.

"RFS Architectural Overview", A. Rifkin et al., Jun. 1986, pp. 248–259.

"Scalable, Secure, and Highly Available Distributed File Access", M. Satyanarayanan, *Computer 23 No.5*, May 1990, pp. 9–20.

"A Snapshot Differential Refresh Algorithm", B. Lindsay et al., *ACM SIGMOD Record*, 15 2, 1986, pp. 53–60.

"Software spins wheels in niche markets", K. Scherberger, *Network World*, Feb. 19, 1996, p. 49.

Space and Time Savings Through Large Data Base Compression and Dynamic Restructuring, P. Alsberg, *Proceedings of the IEEE*, vol. 63, No. 8, Aug. 1975, pp. 1114–1122.

"Sun–3 Architecture" Anon., Aug. 1986, pp. 8–9, 49–57.

"Supporting Application–Specific Resolution in an Optimistically Replicated File System", P. Kumar et al., *IEEE*, 1993, pp. 66–70.

"System Isolation and Network Fast–Fail Capability in Solaris", G. Montenegro et al., *Mobile and Location–Independent Computing Symposium*, 1995, pp. 67–78.

"Transaction Support in a Log–Structured File System", M. Seltzer, *IEEE—Ninth International Conference on Data Engineering*, 1993, pp. 503–510.

"The Transparent Remote File System", R. Hughes, Date Unknown.

"Two Levels of Filesystem Hierarchy on One Disk", V. Cate, *Department of Computer Science, Carnegie Mellon University*, May 1990, pp. 1–20.

"Using Prospero to Support Integrated Location–Independent Computing", B. Neuman et al., *Mobile and Location–Independent Computing Symposium*, 1994, pp. 29–34.

"Wireless IR lets mobile devices get personal" (partial article), J. Edney, *Electronic Engineering Times*, Feb. 19, 1996, p. 44.

"Wireless LANs roaming for standards" (partial article), unknown, *Electronic Engineering Times*, Feb. 19, 1996, p. 65.

"Wireless nets come of age", I. Gillott, *Network World*, Feb. 19, 1996, p p. 50, 52.

Summary of Fitler et al. Invention, 1992.

Mobile NetWare Lite Specification, Version 1.0, Aug. 20, 1992 (best available copy).

TRANSACTION SYNCHRONIZATION IN A DISCONNECTABLE COMPUTER AND NETWORK

This application is a 371 of PCT/US96/11901 filed Jul. 18, 1996. This case claims benefit of provisional application Ser. No. 60/001261 filed Jul. 20, 1995.

FIELD OF THE INVENTION

The present invention relates to the synchronization of transactions performed on separated disconnectable computers, such as transactions performed on a mobile computer and on a computer network while the mobile computer and the network are disconnected, or transactions performed on separate server computers in a network. More particularly, the present invention relates to the synchronization of transactions when the separate computers are reconnected.

TECHNICAL BACKGROUND OF THE INVENTION

It is often convenient, and sometimes essential, to carry a computer and selected data while traveling. It may also be convenient or essential to access a computer network using a "mobile computer" such as a laptop, palmtop, notebook, or personal digital assistant. However, different types of mobile computing make very different assumptions about the use and availability of computer networks.

Some mobile computers are not ordinarily connected to a computer network. Like their non-traveling "stand-alone" counterparts, such "walk-alone" computers cannot be connected to a network unless significant hardware or software modifications are made to them or to the network.

"Mobile-link" portable computers are typically connected to a computer network and attempt (with varying degrees of success) to maintain that network connection during mobile use through a wireless link. Typical wireless links use radio waves or infrared light as carriers. Mobile-link computers can be used in a walk-alone mode if the network connection is lost. However, mobile-link systems provide few or no automatic facilities to synchronize the mobile-link computer with the network when the connection is re-established.

"Disconnectable" computers include portable computers that operate in either a walk-alone or a mobile-link mode and provide significant automated facilities for synchronizing operations performed on the mobile computer with operations performed on the network. Disconnectable computers need not be portable. For instance, separate server computers in a wide-area network (WAN) or other network that are connected to one another only sporadically or at intervals may be disconnectable computers.

Unfortunately, conventional disconnectable computers still rely routinely on manually directed file copying to select the data that will be used in the field. Moreover, conventional disconnectable computer systems are not easily extended to support a variety of database formats, and they do not properly handle the situation in which changes to the "same" data are made on both the portable computer and on a network computer during disconnected operation.

For instance, the Coda File System ("Coda") is a client-server system that provides limited support for disconnectable operation. To prepare for disconnection, a user may hoard data in a client cache by providing a prioritized list of files. On disconnection, two copies of each cached file exist: the original stored on the server, and a duplicate stored in the disconnected client's cache. The user may alter the duplicate file, making it inconsistent with the server copy. Upon reconnection, this inconsistency may be detected by comparing timestamps.

However, the inconsistency is detected only if an attempt is made to access one of the copies of the file. The Coda system also assumes that the version stored in the client's cache is the correct version, so situations in which both the original and the duplicate were altered are not properly handled. Moreover, the Coda synchronization mechanism is specifically tailored, not merely to file systems, but to a particular file system (a descendant of the Andrew File System). Coda provides no solution to the more general problem of synchronizing transactions in a distributed database that can include objects other than file and directory descriptors.

Some approaches to distributed database replication are not directed to mobile computing per se but do attempt to ensure consistency between widely separated replicas that collectively form the database. Examples include, without limitation, the replication subsystem in Lotus Notes and the partition synchronization subsystem in Novell NetWare® 4.1 (LOTUS NOTES is a trademark of International Business Machines, Inc. and NETWARE is a registered trademark of Novell, Inc.).

However, some of these approaches to replication are not transactional. A transaction is a sequence of one or more operations which are applied to a replica on an all-or-nothing basis. Non-transactional approaches may allow partially completed update operations to create inconsistent internal states in network nodes. Non-transactional approaches may also require a synchronization time period that depends directly on the total number of files, directories, or other objects in the replica. This seriously degrades the performance of such approaches when the network connection used for synchronization is relatively slow, as many modem or WAN links are.

Moreover, in some conventional approaches potentially conflicting changes to a given set of data are handled by simply applying the most recent change and discarding the others. Another drawback of several conventional approaches to replication is the requirement they impose that either or both computer systems be locked out of use while the replicas are being synchronized.

Another drawback of conventional disconnected computing approaches is that the location of data on the mobile computer does not always correspond to its location on the network computer. Files may be located in one subdirectory or on one drive during connected operation and in another subdirectory or on another drive during disconnected operation. Thus, the mobile computer does not present the same view of the network when it is disconnected as it does when connected to the network. In addition to creating a risk of confusion and conflicting file versions, these conventional approaches require users to repeatedly reconfigure application programs to look for data in different locations.

Thus, it would be an advancement in the art to provide a system and method for properly synchronizing transactions when a disconnectable computer is reconnected to a network.

It would be an additional advancement to provide such a system and method which identify potentially conflicting database changes and allow their resolution by either automatic or manual means.

It would also be an advancement to provide such a system and method which are not limited to file system operations but can instead be extended to support a variety of database objects.

It would be an additional advancement to provide such a system and method which do not require a synchronization time period that depends directly on the total number of files, directories, or other objects in the replica.

It would be a further advancement to provide such a system and method which do not lock either the mobile computer or the network computers during synchronization.

It would be an additional advancement to provide such a system and method which present consistent file locations regardless of whether the mobile computer is connected to the network.

Such a system and method are disclosed and claimed herein.

BRIEF SUMMARY OF THE INVENTION

The present invention provides a system and method which facilitate disconnected mobile computing in several ways. Prior to disconnection, the invention allows network administrators or users to readily select data that should be copied from a network to a mobile computer by simply identifying one or more target database subtrees. During disconnected operation of the mobile computer, the invention presents the user with a "virtual network" environment that is consistent in use and appearance with the selected portion of the actual network.

Finally, upon reconnection of the mobile computer to the network, the invention synchronizes operations performed on the mobile computer during the disconnected interval with operations performed on the network during that interval. Synchronization is both substantially automatic and transactional, so minimal user intervention is needed and inconsistent internal states are avoided. Moreover, synchronization does not routinely discard any of the changes made on either the network or the mobile computer.

One embodiment of a system according to the present invention includes at least two computers capable of being connected by a network link. One computer will act as the mobile computer, while the other acts as the network. Of course, the network may also include more than one computer after the mobile computer is disconnected. Suitable mobile computers include laptops, palmtops, notebooks, and personal digital assistants. Suitable network computers include additional mobile computers as well as desktop, tower, workstation, micro-, mini-, and mainframe computers. Suitable network links include packet-based, serial, internet-compatible, local area, metropolitan area, wide area, and wireless network links.

Each of the computers includes a non-volatile storage device such as a magnetic or optical disk or disk array. Initially, the storage device on the network computer contains at least a portion of a target database. The target database includes file descriptors, directory descriptors, directory services objects, printer jobs, or other objects. The target database is a distributed database whose entries may be kept in one or more replicas on different computers.

Each replica of the target database contains at least some of the same variables or records as the other replicas, but different replicas may temporarily contain different values for the same variable or record. Such inconsistencies are temporary because changes in value are propagated throughout the replicas by the invention. Thus, if the changes to a particular variable or record are infrequent relative to the propagation delay, then all replicas will converge until they contain the same value for that variable or record.

Selected portions of the database may be copied from the network computer to the mobile computer's storage device prior to disconnection as a basis for the mobile computer's virtual network. Copying is accomplished using a device controller in each computer, a replica manager on each computer, and the network link. The device controller on each computer communicates with that computer's storage device to control data transfers.

Each computer's replica manager communicates with the device controller of that computer and with the network link. Each replica manager also communicates with a database manager on its computer. The database manager can send database transactions to the device controller only through the replica manager, allowing the replica managers to log transactions and to synchronize the transactions after the network connection is re-established.

Each replica manager includes a replica distributor and a replica processor. The replica distributor insulates the database manager from the complexities caused by having target database entries stored in replicas on multiple computers, while still allowing the database manager to efficiently access and manipulate individual target database objects, variables, and/or records. The replica processor maintains information about the location and status of each replica and ensures that the replicas tend to converge.

The network link supports a remote procedure call ("RPC"), distributed memory, or similar mechanism to allow replica distributors to call procedures in the replica processors on or more network computers. The network link also tracks connectivity information such as which network computers are currently accessible and what state those computers are in.

Each replica distributor includes at least a consistency distributor and a location distributor, and each replica processor includes at least a consistency processor and a location state processor. The consistency distributors and consistency processors maintain convergent consistency of the target database replicas. The location distributors and the location state processors are used to determine the storage locations of database entries.

The replica distributor may also include an object distributor and an object schema, in which case the corresponding replica processor includes an object processor. The object distributor provides an interface to target database objects, making operations such as "add object", "modify object", and "read object" available. The objects are defined using a compile-time schema definition language. The database manager and various subsystems of the replica manager can all query the object schema to obtain information regarding the format and storage requirements of objects, but semantic interpretation of object values is generally restricted to the database manager.

One embodiment of the replica processor also includes a transaction logger which maintains a log of recent updates for each object in the target database. This log allows recovery of local transactions after power losses or other unexpected interruptions. The transaction log at a given location also provides an efficient source of the updates needed to bring other locations up to date. Transaction logs are further, described in a commonly owned copending application Ser. No. 08/700,490, entitled TRANSACTION LOG MANAGEMENT IN A DISCONNECTABLE COMPUTER AND NETWORK, filed the same day and having the same inventors as the present application.

In one embodiment, the replica distributor and replica processor contain a file distributor and a file processor, respectively. These file subsystems provide access to file contents for operations such as "read" and "write" on file objects. The file distributor and processor insulate the database manager from complexities caused by the distributed nature of the target database files. More generally, the replica managers intercept any file system or operating system call that directly accesses replicated files or database entries, so that consistent convergent replicas are maintained.

One embodiment of the replica manager contains trigger function registrations. Each registration associates a trigger function with a target database operation such that the registered trigger function will be invoked on each replica, once the computers are connected, if the associated operation is requested of the database manager. The trigger function is invoked on each replica after the associated operation request is transmitted from the database manager to the replica manager. Trigger functions can be used to handle tasks such as file replication, where the file contents are not directly accessed by the database manager, while ensuring that files converge in a manner consistent with the database operation.

In operation, the replica managers synchronize transactions upon reconnection in the following manner. Using the network link, a network connection is created between the mobile computer and a network computer. The network computer need not be the network computer from which the mobile computer was disconnected. The replica manager on the mobile computer identifies a transaction that targets an object in a replica on the mobile computer, and locates a corresponding replica that resides on the network computer. The mobile computer then transfers an update based on the transaction over the network connection to the network computer.

Meanwhile, the replica manager on the network computer performs similar steps, determining whether another transaction targeted an entry in the network computer replica and transferring an update based on any such transaction to the mobile computer's replica manager over the same network connection. The respective replica managers then apply the transaction updates to their respective replicas. The process is repeated for any other replicas in the network, with pairs of replica managers propagating the updates from the mobile computer throughout the network. To prevent inconsistencies, access to each replica is by way of a target database object lock that serializes updates to the replica, and the updates are applied atomically.

Each completed transaction has a corresponding transaction sequence number, and the transaction sequence numbers are consecutive and monotonic for all completed transactions. The update transferred by the replica manager includes both the transaction sequence number of the transaction in question and a location identifier specifying the computer on which the transaction was first requested. A missed update is indicated by a gap in the sequence of transferred transaction numbers.

During synchronization the replica managers detect mutually inconsistent updates to a given entry, and attempt to resolve such "clashes" automatically or with user assistance. Clash handling is further described in a commonly owned copending application entitled TRANSACTION CLASH MANAGEMENT IN A DISCONNECTABLE COMPUTER AND NETWORK, filed the same day and having the same inventors as the present application, now U.S. Pat. No. 5,878,434.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF TEE PREFERRED EMBODIMENTS

Figure 1:
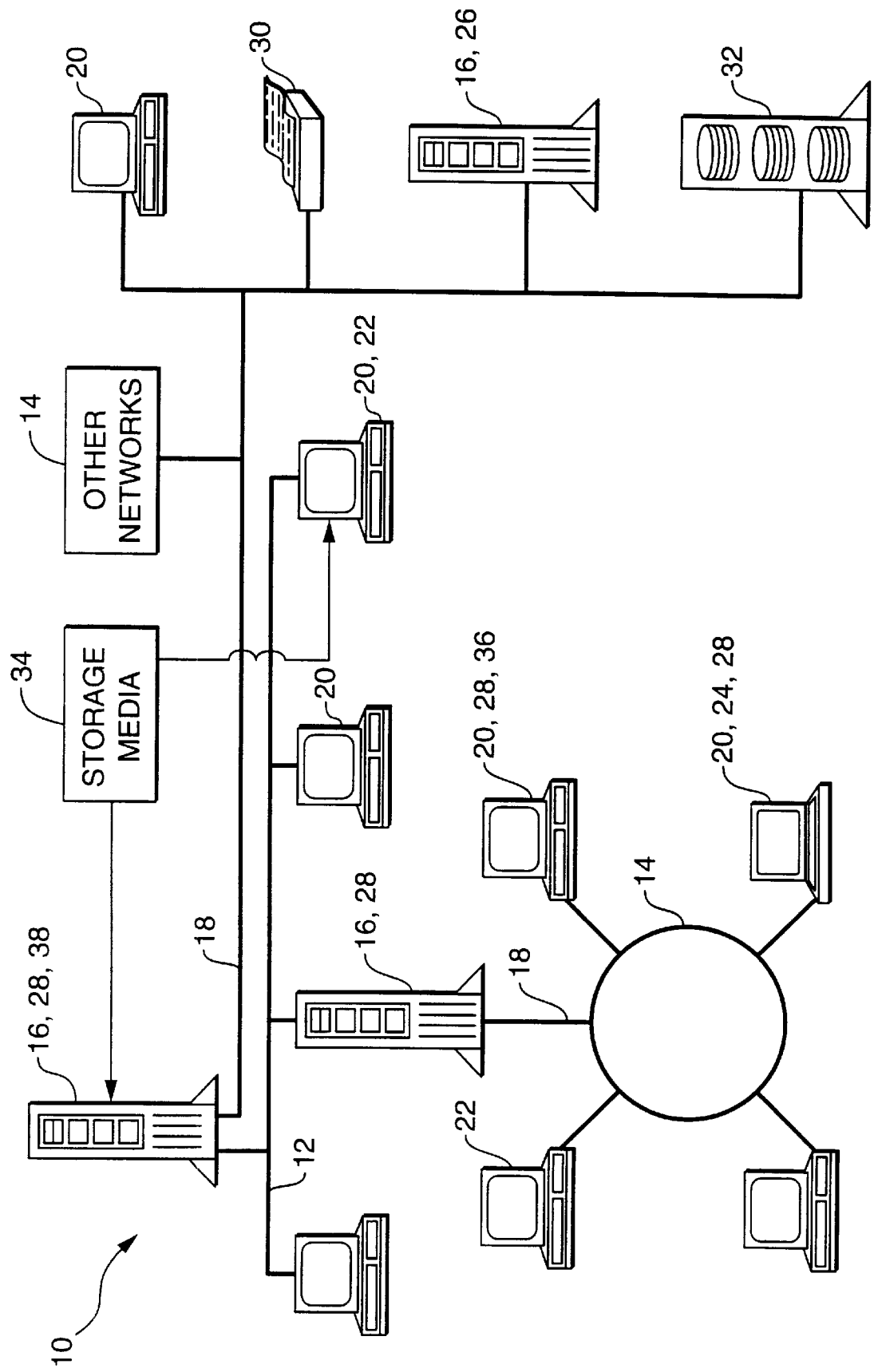
FIG. 1 is a schematic illustration of a computer network suitable for use with the present invention.

Reference is now made to the Figures wherein like parts are referred to by like numerals. The present invention relates to a system and method which facilitate disconnected computing with a computer network. One of the many computer networks suited for use with the present invention is indicated generally at 10 in FIG. 1.

In one embodiment, the network 10 includes Novell NetWare® network operating system software, version 4.x (NETWARE is a registered trademark of Novell, Inc.). In alternative embodiments, the network includes Personal NetWare, NetWare Mobile, VINES, Windows NT, LAN Manager, or LANtastic network operating system software (VINES is a trademark of Banyan Systems; NT and LAN Manager are trademarks of Microsoft Corporation; LANtastic is a trademark of Artisoft). The network 10 may include a local area network 12 which is connectable to other networks 14, including other LANs, wide area networks, or portions of the Internet, through a gateway or similar mechanism.

The network 10 includes several servers 16 that are connected by network signal lines 18 to one or more network clients 20. The servers 16 may be file servers, print servers, database servers, Novell Directory Services servers, or a combination thereof. The servers 16 and the network clients 20 may be configured by those of skill in the art in a wide variety of ways to operate according to the present invention.

The network clients 20 include personal computers 22, laptops 24, and workstations 26. The servers 16 and the network clients 20 are collectively denoted herein as computers 28. Suitable computers 28 also include palmtops, notebooks, personal digital assistants, desktop, tower, micro-, mini-, and mainframe computers. The signal lines 18 may include twisted pair, coaxial, or optical fiber cables, telephone lines, satellites, microwave relays, modulated AC power lines, and other data transmission means known to those of skill in the art.

In addition to the computers 28, a printer 30 and an array of disks 32 are also attached to the illustrated network 10. Although particular individual and network computer systems and components are shown, those of skill in the art will appreciate that the present invention also works with a variety of other networks and computers.

At least some of the computers 28 are capable of using floppy drives, tape drives, optical drives or other means to read a storage medium 34. A suitable storage medium 34 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 34 tangibly embodies a program, functions, and/or instructions that are executable by at least two of the computers 28 to perform transaction synchronization steps of the present invention substantially as described herein.

Figure 2:
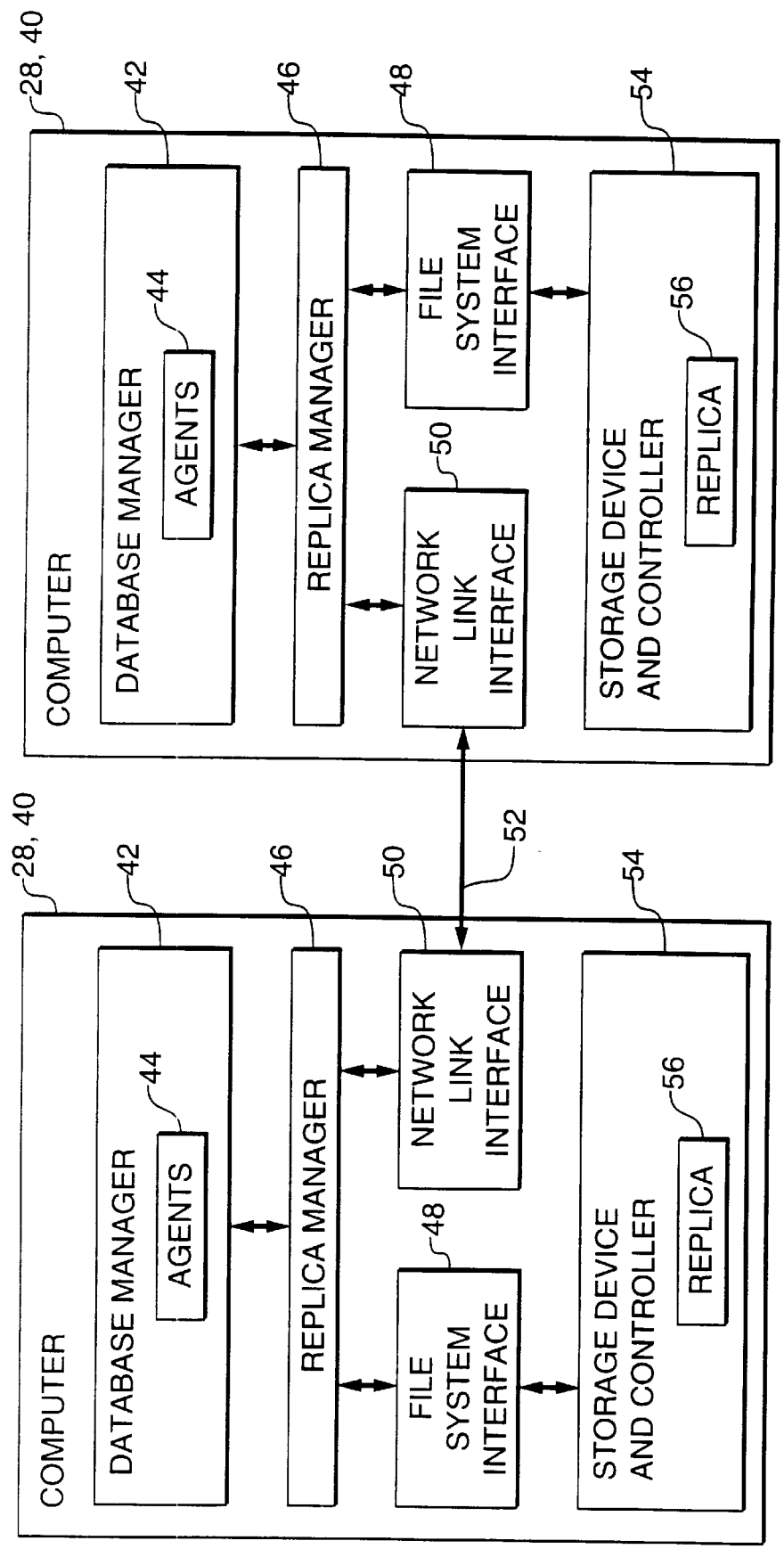
FIG. 2 is a diagram illustrating two computers in a network, each configured with a database manager, replica manager, network link manager, and other components according to the present invention.

With reference to FIG. 2, at least two of the computers 28 are disconnectable computers 40 configured according to the present invention. Each disconnectable computer 40 includes a database manager 42 which provides a location-independent interface to a distributed hierarchical target database embodied in convergently consistent replicas 56. Suitable databases include Novell directory services databases supported by NetWare 4.x.

A database is a collection of related objects. Each object has associated attributes, and each attribute assumes one or more values at any given time. Special values are used internally to represent NULL, NIL, EMPTY, UNKNOWN, and similar values. Each object is identified by at least one "key." Some keys are "global" in that they are normally unique within the entire database; other keys are "local" and are unique only within a proper subset of the database. A database is "hierarchical" if the objects are related by their relative position in a hierarchy, such as a file system hierarchy. Hierarchies are often represented by tree structures.

The target database includes file descriptor objects, directory descriptor objects, directory services objects, printer job objects, or other objects. The target database is distributed in that entries are kept in the replicas 56 on different computers 40. Each replica 56 in the target database contains at least some of the same variables or records as the other replicas 56. The values stored in different replicas 56 for a given attribute are called "corresponding values." In general, corresponding values will be equal.

However, replicas 56 at different locations (namely, on separate computers 40) may temporarily contain different values for the same variable or record. Such inconsistencies are temporary because changes in value are propagated throughout the replicas 56 by the invention. Thus, if the changes to a particular variable or record are infrequent relative to the propagation delay, then all replicas 56 will converge until they contain the same value for that variable or record.

More generally, the present invention provides a basis for a family of distributed software applications utilizing the target database by providing capabilities which support replication, distribution, and disconnectability. In one embodiment, the database manager 42 includes one or more agents 44, such as a File Agent, a Queue Agent, or a Hierarchy Agent. The database manager 42 hides the complexity of distribution of data from the application programs. Distributed programs make requests of the database manager 42, which dispatches each request to an appropriate agent 44.

Each agent 44 embodies semantic knowledge of an aspect or set of objects in the distributed target database. Under this modular approach, new agents 44 can be added to support new distributed services. For instance, assumptions and optimizations based on the semantics of the hierarchy of the NetWare File System are embedded in a Hierarchy Agent, while corresponding information about file semantics are embedded in a File Agent. In one embodiment, such semantic information is captured in files defining a schema 84 (FIG. 3) for use by agents 44.

The schema 84 includes a set of "attribute syntax" definitions, a set of "attribute" definitions, and a set of "object class" (also known as "class") definitions. Each attribute syntax in the schema 84 is specified by an attribute syntax name and the kind and/or range of values that can be assigned to attributes of the given attribute syntax type. Attribute syntaxes thus correspond roughly to data types such as integer, float, string, or Boolean in conventional programming languages.

Each attribute in the schema 84 has certain information associated with it. Each attribute has an attribute name and an attribute syntax type. The attribute name identifies the attribute, while the attribute syntax limits the values that are assumed by the attribute.

Each object class in the schema 84 also has certain information associated with it. Each class has a name which identifies this class, a set of super classes that identifies the other classes from which this class inherits attributes, and a set of containment classes that identifies the classes permitted to contain instances of this class.

An object is an instance of an object class. The target database contains objects that are defined according to the schema 84 and the particulars of the network 10. Some of these objects may represent resources of the network 10. The target database is a "hierarchical" database because the objects in the database are connected in a hierarchical tree structure. Objects in the tree that can contain other objects are called "container objects" and must be instances of a container object class.

A specific schema for the Hierarchy Agent will now be described; other agents may be defined similarly. The ndr_dodb_server class is the top level of the HA-specific database hierarchy. Since a database may contain many servers, the name is treated as a unique key for HA servers within a database.

```
CLASS  ha_server
{
  SUPERCLASS  ndr_dodb_object_header;
  PARENT      ndr_dodb_database;
  PROPERTY    NDR_OS_CLASS_FLAG_FULLY_REPLICATED;
  ATTRIBUTE
  {
    ha_server_name  server_name
    PROPERTY        NDR_OS_ATTR_FLAG_SIBLING_KEY;
  }
```

```
}
CONSTANT  HA_VOLUME_NAME_MAX = 32;
DATATYPE  ha_volume_name    STRING HA_VOLUME_NAME_MAX;
DATATYPE  ha_volume_id      BYTE;
   A volume has a name, which must be unique within the
server and can be used as the root component of a path name:
CLASS  ha_volume
{
   SUPERCLASS  ndr_dodb_object_header;
   PARENT      ha_server;
   PROPERTY    NDR_OS_CLASS_FLAG_NAMESPACE_ROOT;
   ATTRIBUTE
   {
      ha_volume_name   volume_name
      PROPERTY         NDR_OS_ATTR_FLAG_SIBLING_KEY |
                       NDR_OS_ATTR_FLAG_IS_DOS_FILENAME;
      ha_volume_id     volume_id;
   }
}
```

In order to allocate unique volume identifiers this object holds the next free volume ID. Initially this is set to 1, so that the SYS volume can be given ID 0 when it is added to the database, in case any applications make assumptions about SYS:

server, as well as the server-generated volume number. The latter is passed as a byte from class 87 NetWare Core Protocols from which it is read directly into vol (declared as a byte below). Elsewhere in the code the type ndr_host_volume_id (a UINT16) is used for the same value.

```
CLASS  ha_next_volume
{
   SUPERCLASS  ndr_dodb_object_header;
   PARENT      ha_server;
   PROPERTY    ND_R_OS_CLASS_FLAG_UNREPLICATED;
   ATTRIBUTE
   {
      ndr_dodb_dummy_key  dummy_key
      PROPERTY            NDR_OS_ATTR_FLAG_SIBLING_KEY
      COMPARISON          ndr_dodb_dummy_key_compare
      VALIDATION          ndr_dodb_dummy_key_validate;
      ha_volume_id        next_free_volume_id;
   }
}
```

A file or directory name can be 12 (2-byte) characters long:

```
CONSTANT  HA_FILENAME_MAX = 24;
DATATYPE  ha_filename  STRING HA_FILENAME_MAX;
```

```
DATATYPE  ha_file_or_dir_id
{
   ULONG        file_or_dir;
   ha_volume_id vol;
}
```

The ha_file_or_dir_id is a compound unique key embracing the file or directory ID that is allocated by the Files and directories have many shared attributes, the most important being the file name. This must be unique for any parent directory.

```
CLASS  ha_file_or_dir
{
   PARENT      ha_directory;
   SUPERCLASS  ndr_dodb_object_header;
   ATTRIBUTE
   {
      ha_filename          filename
      PROPERTY             NDR_OS_ATTR_FLAG_SIBLING KEY |
                           NDR_OS_ATTR_FLAG_IS_DOS_FILENAME;
      ha_file_or_dir_id    id
      PROPERTY             NDR_OS_ATTR_FLAG_GLOBAL KEY |
                           NDR_OS_ATTR_FLAG_UNREPLYCATED
      GROUP                file_or_dir_id_group;
      ULONG                attributes;
```

```
    SHORT              creation_date;
    SHORT              creation_time;
    ndr_dodb_auth_id   creation_id;
    SHORT              access_date;
    SHORT              archive_date;
    SHORT              archive_time;
    ndr_dodb_auth_id   archive_id;
  }
}
```

A file has some additional attributes not present in a directory, and may contain a contents fork which can be accessed via a file distributor 90 (FIG. 3):

```
CLASS  ha_file
{
  SUPERCLASS  ha_file_or_dir;
  PROPERTY    NDR_OS_CLASS_FLAG_DEFINE_REPLICAS |
              NDR_OS_CLASS_FLAG_HAS_PARTIALLY_REPLICATED_FILE |
              NDR_OS_CLASS_FLAG_HAS_FILE_PATH_NAME |
              NDR_OS_CLASS_FLAG_PARENT_HAS_RSC;
  ATTRIBUTE
  {
    BYTE              execute_type;
    SHORT             update_date
    property          NDR_OS_ATTR_FLAG_UNREPLICATED;
    SHORT             update_time
    property          NDR_OS_ATTR_FLAG_UNREPLICATED;
    ndr_dodb_auth_id  update_id
    property          NDR_OS_ATTR_FLAG_UNREPLICATED;
    ULONG             length
    property          NDR OS ATTR FLAG_UNREPLICATED;
  }
}
```

A directory does not possess a contents fork for file distributor 90 access. The access rights mask is inherited and should be managed by like access control lists ("ACLs"):

```
CLASS  ha_directory
{
  SUPERCLASS  ha_file_or_dir;
  PROPERTY    NDR_OS_CLASS_FLAG_DEFINE_REPLICAS |
              NDR_OS_CLASS_FLAG_HAS_FILE_PATH_NAME |
              NDR_OS_CLASS_FLAG_HAS_RSC;
              //replication support count
  ATTRIBUTE
  {
    BYTE              access_rights_mask;
    SHORT             update_date;
    SHORT             update_time;
    ndr_dodb_auth_id  update_id;
    SHORT             rsc
    PROPERTY          NDR_OS_ATTR_FLAG_IS_RSC |
                      NDR_OS_ATTR_FLAG_UNREPLICATED;
  }
}
```

The root directory must appear at the top of the hierarchy below the volume. Its name is not used; the volume name is used instead. This is the top of the replication hierarchy and therefore is the top level RSC in this hierarchy:

```
CLASS  ha_root_directory
{
  SUPERCLASS  ha_directory;
```

```
                     -continued

PARENT      ha_volume;
  PROPERTY    NDR_OS_CLASS_FLAG_DEFINE_REPLICAS |
              NDR_OS_CLASS_FLAG_HAS_RSC;
}
```

In one embodiment, schemas such as the schema 84 are defined in a source code format and then compiled to generate C language header files and tables. The named source file is read as a stream of lexical tokens and parsed using a recursive descent parser for a simple LL(1) syntax. Parsing an INCLUDE statement causes the included file to be read at that point. Once a full parse tree has been built (using binary nodes), the tree is walked to check for naming completeness. The tree is next walked in three passes to generate C header (.H) files for each included schema file. The header generation passes also compute information (sizes, offsets, and so forth) about the schema which is stored in Id nodes in the tree. Finally, the complete tree is walked in multiple passes to generate the schema table C source file, which is then ready for compiling and linking into an agent's executable program.

Each disconnectable computer 40 also includes a replica manager 46 which initiates and tracks location-specific updates as necessary in response to database manager 42 requests. The replica manager is discussed in detail in connection with later Figures.

A file system interface 48 on each computer 40 mediates between the replica manager 46 and a storage device and controller 54. Suitable file system interfaces 48 include well-known interfaces 48 such as the File Allocation Table ("FAT") interfaces of various versions of the MS-DOS® operating system (MS-DOS is a registered trademark of Microsoft Corporation), the XENIX® file system (registered trademark of Microsoft Corporation), the various NOVELL file systems (trademark of Novell, Inc.), the various UNIX file systems (trademark of Santa Cruz Operations), the PCIX file system, the High Performance File System ("HPFS") used by the OS/2 operating system (OS/2 is a mark of International Business Machines Corporation), and other conventional file systems.

Suitable storage devices and respective controllers 54 include devices and controllers for the media disclosed above in connection with the storage medium 34 (FIG. 1) and other conventional devices and controllers, including non-volatile storage devices. It is understood, however, that the database replicas 56 stored on these media are not necessarily conventional even though the associated devices and controllers 54 may themselves be known in the art.

Each computer 40 also has a network link manager 50 that is capable of establishing a network connection 52 with another disconnectable computer 40. Suitable network link managers 50 include those capable of providing remote procedure calls or an equivalent communications and control capability. One embodiment utilizes "DataTalk" remote procedure call software with extended NetWare Core Protocol calls and provides functionality according to the following interface:

| | |
|---|---|
| rpc_init() | Initialize RPC subsystem |
| rpc_shutdown() | Shutdown RPC subsystem |
| rpc_execute() | Execute request at single location |
| rpc_ping() | Ping a location (testing) |
| rpc_claim_next_execute() | Wait until the next rpc_execute() is guaranteed to be used by this thread |
| rpc_free_next execute() | Allow others to use rpc_execute() |

Those of skill in the art will appreciate that other remote procedure call mechanisms may also be employed according to the present invention. Suitable network connections 52 may be established using packet-based, serial, internet-compatible, local area, metropolitan area, wide area, and wireless network transmission systems and methods.

Figure 3:
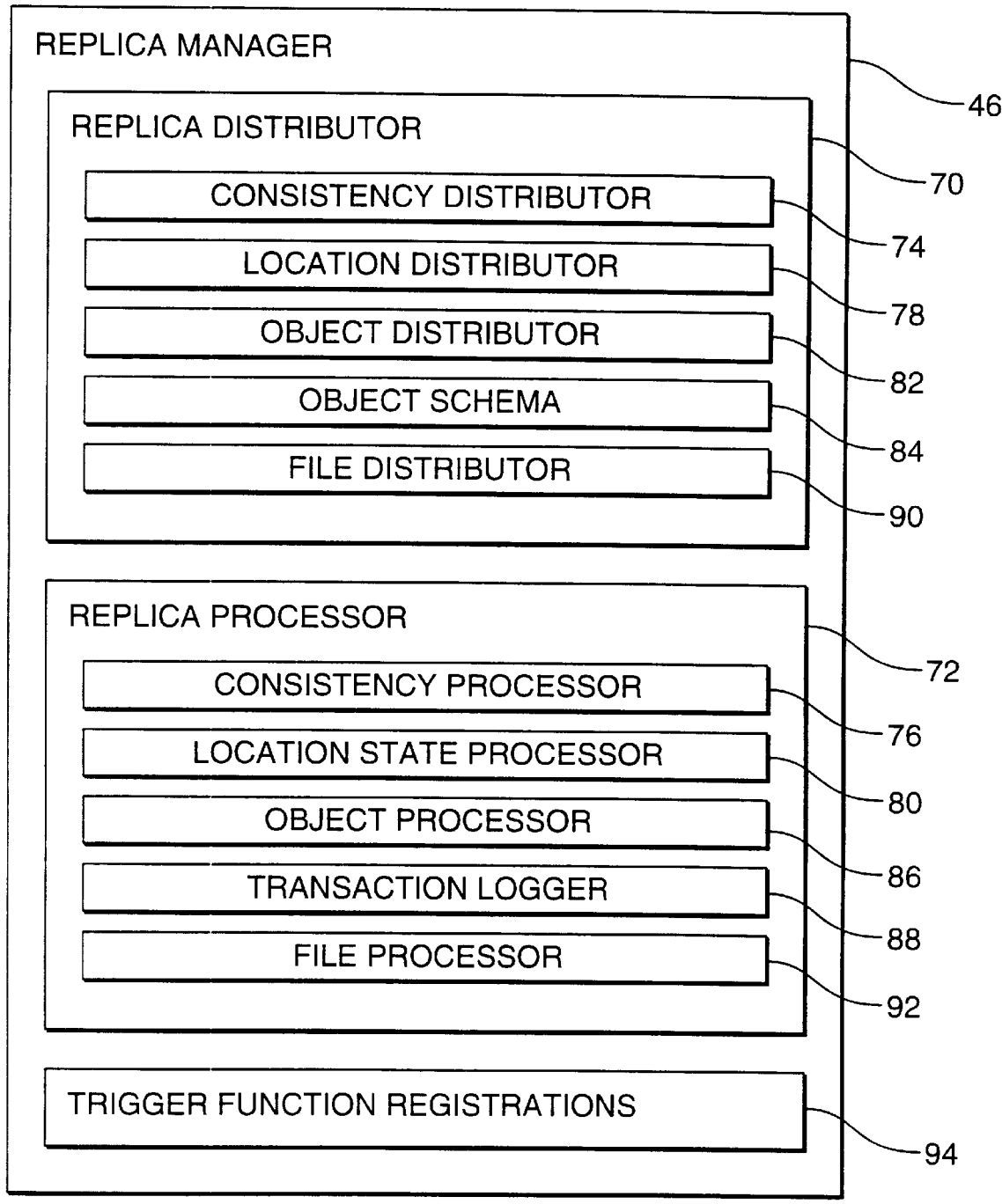
FIG. 3 is a diagram further illustrating the replica managers shown in FIG. 2.

FIGS. 2 and 3 illustrate one embodiment of the replica manager 46 of the present invention. A replica distributor 70 insulates the database manager 42 from the complexities caused by having database entries stored in replicas 56 on multiple computers 40 while still allowing the database manager 42 to efficiently access and manipulate individual database objects, variables, and/or records. A replica processor 72 maintains information about the location and status of each replica 56 and ensures that the replicas 56 tend to converge.

A consistency distributor 74 and a consistency processor 76 cooperate to maintain convergent and transactional consistency of the database replicas 56. The major processes used include an update process which determines how transaction updates are applied, an asynchronous synchronization process that asynchronously synchronizes other locations in a location set, a synchronous synchronization process that synchronously forces two locations into sync with each other, an optional concurrency process that controls distributed locking, and a merge process that adds new locations to a location set. In one embodiment, processes for synchronization and merging are implemented using background software processes with threads or similar means. The concurrency process may be replaced by a combination of retries and clash handling to reduce implementation cost and complexity.

Each location is identified by a unique location identifier. A "location sync group" is the group of all locations that a specific location synchronizes with. The location sync group for a database replica 56 on a client 20 is the client and the server 16 or other computer 28 that holds a master replica 56; the computer 28 holding the master replica 56 is the "storage location" of the target database. The location sync group for the computer 28 that holds the master replica 56 is all computers 28 connectable to the network that hold a replica 56. A "location set" is a set of presently connected locations in a location sync group. Locations in an "active location set" have substantially converged, while those in a "merge location set" are currently being merged into the active location set. Objects are read at a "reference location" and updated at an "update location," both of which are local when possible for performance reasons. To support concurrency control, objects require a "lock location" where they are locked for read or update; the local location is the same for all processes in a given location set.

According to one update process of the present invention, the updates for a single transaction are all executed at one update location. Each group of updates associated with a single transaction have a processor transaction identifier ("PTID") containing the location identifier of the update location and a transaction sequence number. The transaction sequence number is preferably monotonically consecutively increasing for all completed transactions at a given location, even across computer 28 restarts, so that other locations receiving updates can detect missed updates.

The PTID is included in update details written to an update log by an object processor 86. An update log (sometimes called an "update stream") is a chronological record of operations on the database replica 56. Although it may be prudent to keep a copy of an update log on a non-volatile storage device, this is not required. The operations will vary according to the nature of the database, but typical operations include adding objects, removing objects, modifying the values associated with an object attribute, modifying the attributes associated with an object, and moving objects relative to one another.

The PTID is also included as an attribute of each target database object to reflect the latest modification of the object. In one embodiment, the PTID is also used to create a unique (within the target database) unique object identifier ("UOID") when a target database object is first created.

A target database object may contain attributes that can be independently updated. For instance, one user may set an archive attribute on a file while a second user independently renames the file. In such situations, an object schema 84 may define attribute groups. A separate PTID is maintained in the object for each attribute group, thereby allowing independent updates affecting different attribute groups of an object to be automatically merged without the updates being treated as a clash.

The consistency distributor 74 gathers all of the updates for a single transaction and sends them, at close transaction time, to the update location for the transaction. The consistency processor 76 on the update location writes the updates to a transaction logger 88. In one embodiment, the transaction logger 88 buffers the updates in memory (e.g. RAM). If the update location is not local then the updates are committed to the transaction log and the PTID for the transaction is returned, so that the same updates can be buffered locally; this allows all updates to be applied in order locally. In this manner the transaction updates are applied to the update location.

An objective of one asynchronous synchronization process of the present invention is to keep the rest of the locations in the location set in sync without unacceptable impact on foreground software process performance. This is achieved by minimizing network transfers.

A process of the consistency processor 76 (such as a background software process) either periodically or on demand requests the transaction logger 88 to force write all pending transactions to the log and (eventually) to the target database. The consistency processor 76 also causes the batch of updates executed at an update location to be transmitted to all other locations in the current location set as a "SyncUpdate" request. These updates are force written to the log before they are transmitted to other locations, thereby avoiding use of the same transaction sequence number for different transactions in the event of a crash.

The SyncUpdate requests are received by other locations in the same location set and applied to their in-memory transaction logs by their respective consistency processors 76. Each consistency processor 76 only applies SyncUpdate transactions which have sequence numbers that correspond to the next sequence number for the specified location.

The consistency processor 76 can determine if it has missed updates or received them out of order by examining the PTID. If updates are missed, the PTID of the last transaction properly received is sent to the consistency distributor 74 that sent out the updates, which then arranges to send the missing updates to whichever consistency processors 76 need them.

Acknowledged requests using threads or a similar mechanism can be used in place of unacknowledged requests sent by non-central locations. Non-central locations (those not holding a master replica 56) only need to synchronize with one location and thus only require a small number of threads. To promote scalability, however, central locations preferably use unacknowledged broadcasts to efficiently transmit their SyncUpdate requests.

The asynchronous synchronization process causes SyncUpdate requests to be batched to minimize network transfers. However, the cost paid is timeliness. Accordingly, a synchronous synchronization process according to the present invention may be utilized to selectively speed up synchronization. The synchronous synchronization process provides a SyncUptoPTID request and response mechanism.

In one embodiment, the SyncUptoPTID mechanism utilizes a SyncState structure which is maintained as part of a location state structure or location list that is managed by a location state processor 80 in the memory of each computer 28. The SyncState structure for a given location contains a location identifier and corresponding transaction sequence number for the most recent successful transaction applied from that location. The SyncState structure is initialized from the update log at startup time and updated in memory as new transactions are applied.

A SyncUptoPTID request asks a destination to bring itself up to date with a source location according to a PTID. The destination sends a copy of the SyncState structure for the source location to that source location. The source location then sends SyncUpdate requests to the destination location, as previously described, up to an including the request with the PTID that was specified in the SyncUptoPTID request. In a preferred embodiment, the central server is a NetWare server and the SyncUptoPTID requirements are approximately 100 bytes per location, so scalability is not a significant problem for most systems.

A merge process according to the present invention includes merging location sets when disconnected disconnectable computers are first connected or reconnected. For instance, merging location sets normally occurs when a computer new to the network starts up and merges into an existing location set. Merging can also happen when two sets of computers become connected, such as when a router starts. Merging can also occur when requested by a user, when the network load drops below a predetermined threshold for a predetermined period of time, or on a scheduled basis, such as every night at 1 AM.

Merging occurs when two replicas 56 are resynchronized after the computers 28 on which the replicas 56 reside are reconnected following a period of disconnection. Either or both of the computers 28 may have been shut down during the disconnection. A set of updates are "merged atomically" if they are merged transactionally on an all-or-nothing basis. A distributed database is "centrally synchronized" if one computer 28, sometimes denoted the "central server," carries a "master replica" with which all merges are performed.

Portions of the master replica or portions of another replica 56 may be "shadowed" during a merge. A shadow replica, sometimes called a "shadow database", is a temporary copy of at least a portion of the database. The shadow database is used as a workspace until it can be determined whether changes made in the workspace are consistent and thus can all be made in the shadowed replica, or are inconsistent and so must all be discarded. The shadow database uses an "orthogonal name space." That is, names used in the shadow database follow a naming convention which guarantees that they will never be confused with names in the shadowed database.

A "state-based" approach to merging compares the final state of two replicas 56 and modifies one or both replicas 56 to make corresponding values equal. A "log-based" or "transaction-based" approach to merging incrementally applies successive updates made on a first computer 28 to the replica 56 stored on a second computer 28, and then repeats the process with the first computer's replica 56 and the second computer's update log. A hybrid approach uses state comparison to generate an update stream that is then applied incrementally. The present invention preferably utilizes transaction-based merging rather than state-based or hybrid merging.

As an illustration, consider the process of merging a single new location A with a location set containing locations B and C. In one embodiment, the following performance goals are satisfied:

(a) Use of locations B and C is not substantially interrupted by synchronization of the out-of-date location A with B and C; and (b) Users connected to location A (possibly including multiple users if location B is a gateway) are able to see the contents of the other locations in the set within a reasonable period of time.

Merging typically occurs in three phases. During a "merging out" phase location A sends newer updates to location B. For instance, if A's location list contains PTID 50:14 (location identifier:transaction sequence number) and B's location list contains PTID 50:10, then the newer updates sent would correspond to PTID values 50:11 through 50:14.

During a "merging in" phase new updates in the merge location B are merged into A's location. For instance, suppose A's location list contains PTIDs 100:12 and 150:13 and B's location list contains PTIDs 100:18 and 150:13. Then the new updates would correspond to PTID values 100:13 through 100:18. If updates are in progress when merging is attempted, the initial attempt to merge will not fully succeed, and additional iterations of the merging in and merging out steps are performed.

In one embodiment, merging does not include file contents synchronization. Instead file contents are merged later, either by a background process or on demand triggered by file access. This reduces the time required for merging and promotes satisfaction of the two performance goals identified above. In embodiments tailored to "slow" links, merging is preferably on-going to take advantage of whatever bandwidth is available without substantially degrading the perceived performance of other processes running on the disconnectable computers.

In embodiments employing an update log, the log is preferably compressed prior to merging. Compression reduces the number of operations stored in the log. Compression may involve removing updates from the log, altering the parameters associated with an operation in a given update, and/or changing the order in which updates are stored in the log.

In one embodiment, all Object Database calls come through the consistency distributor 74, which manages distributed transaction processing and maintains consistency between locations. Almost all calls from a location distributor 78 are made via the consistency distributor 74 because the consistency distributor 74 supports a consistent view of the locations and the database replicas 56 on them.

The consistency distributor 74 and an object distributor 82 support multiple concurrent transactions. This is needed internally to allow background threads to be concurrently executing synchronization updates. It could also be used to support multiple concurrent gateway users. In an alternative embodiment, multiple concurrent transactions on the same session is supported through the consistency distributor 74.

In one embodiment, the consistency distributor 74 and the consistency processor 76 are implemented in the C programming language as a set of files which provide the functionality described here. Files CD.H and CD.C implement part of the consistency distributor 74. A separate module having files CD_BG.H and CD_BG.C is responsible for background processes associated with merging and synchronization. A module having files CDI.H and CDI.C contains functions used by both the CD and CD_BG modules. These modules provide functionality according to the following interface:

| | |
|---|---|
| cd_init | Init CD |
| cd_shutdown | Shutdown CD |
| cd_create_replica | Create a replica of a specified database |
| cd_remove_replica | Remove a replica of a specified database |
| cd_load_db | Load an existing database |
| cd_unload_db | Unload an existing database |
| cd_merge_start | Start merge of active and merge location sets |
| cd_merge_stop | Stop merge |
| cd_start_txn | Start a CD transaction |
| cd_set_txn_ref_loc | Set reference/update lid (location identifier) for txn (transaction) |
| cd_get_txn_desc | Get a txn descriptor given a txn id |
| cd_abort_txn | Abort a CD transaction |
| cd_end_txn | End a CD transaction |
| cd_commit | Commit all previously closed txns to disk |
| cd_execute_txn | Execute locks and updates for a txn |
| cd_read | Do read or lookup reguest |
| cd_readn | Do readn |
| cd_lookup_by_uoid | Do lookup using UOID |
| cd_add_lock | Add an object or agent lock |
| cd_remove_lock | Remove an object or agent lock |
| cd_modify_attribute | Modify a single attribute in a previously read object |
| cd_init_new_doid | Setup all fields in a new doid |
| cd_add | Add a new object |
| cd_remove | Remove an object |
| cd_move | Move an object |
| cd_set_marker | Add marker point to txn |
| cd_revert_to_marker | Revert txn state to last marker |
| cd_get_effective_access_right | Get the effective access rights for the current session and object |
| cd_convert_uoid2doid | Convert UOID to DOID |
| cd_sync_object | Get the server to send a newly replicated object |
| cd_bg_init | Initialize CD background processes |
| cd_bg_merge | Execute a background merge |
| cd_bg_sync_remote_upto_ptid | Bring remote location up to date with local PTID |
| cdi_init | |
| cdi_shutdown | |
| cdi_execute_ack_sys | Execute acknowledged request using system session |
| cdi_execute_ack | Execute acknowledged request |
| cdi apply_locks | Apply locks for txn |
| cdi_abort_prc_txn | Remove all locks already set for a txn |
| //Forced update location (used to change update location when executing clash handler functions) | |
| cdi_register_forced_update_location | Register location to be used as update location for thread |
| cdi_unregister_forced_update_location | Unregister location to be used as update location for thread |
| cdi_get_forced_update_location | Get forced update location for thread |
| cdi sync_upto_ptid | Bring location up to date with PTID |
| cdi_sync_upto_now | Bring location up to date with latest PTID |
| cdi_sync_loc_list | Make any location list consistent with destination location list and return info on mismatch of PTIDs |
| cdi_read_loc_list | Read location list |
| cdi_sync_upt_o_dtid | Bring location up to date with DTID |

Since updates are cached during a transaction, special handling of reads performed when updates are cached is required. In one embodiment, the caller of cd_read( ) or cd_read( ) sees the results of all updates previously executed in the transaction. In an alternative embodiment, for cd_read( ) reads will see all previously added objects and will see the modified attributes of objects, but will not see the effects of moves or removes. Thus if an object is removed during a transaction the read will behave as if it has not been removed. The same is true for moved objects. Modifications to keys will have no effect on reads using the keys. The cd_read( ) function behaves as if none of the updates in the current transaction have been applied.

In one embodiment, the consistency processor 76, which processes all distributed object database requests, includes background processes that manage object database updates on local locations and synchronization of locations. Within this embodiment, a CP module contains a dispatcher for all requests which call functions that have a prefix of "cpXX_"; a CPR module processes read requests; a CPU module processes update and lock requests; a CPSM module processes synchronization and merging requests; a CP_BG module controls background processing which includes scheduling multiple background threads, controlling the state of all local locations and synchronization of local locations with local and remote locations; and a CPUI module provides functions that are shared by the CP_BG and CPx modules. These modules provide functionality according to the following interface:

| | |
|---|---|
| cp_init | Includes performing mounting of local locations and recovery of TL (transaction logger 88) and OP (object processor 86) |
| cp_shutdown | Shutdown CP |
| cp_process | Process a consistency request |
| cp_clear_stats | Reset CP statistics |
| cp_dump_stats | Dump CP statistics to the log |
| cpr_process_read | Process OP read or lookup request |
| cpr_process_readn | Process readn request |
| cpu_register_dtid | Register use of a DTID at a reference location |
| cpu_execute_txn | Execute single txn at reference location |
| cpu_commit | Commit all txns for session |
| cpu_add_locks | Add list of locks |
| cpu_remove_locks | Remove list of locks |
| cpu_abort_prc_txn | Remove object locks for specified transaction |
| cpsm_sync_upto_ptid | Bring remote locations up to date as far as given PTID |
| cpsm_get_latest_ptid | Obtain the latest PTID |
| cpsm_get_sync_object | Remote machine wants to sync a newly replicated object |
| cpsm_sync_object | Add a newly replicated object to the local database |
| cpsm_get_sync_update | Get a local sync_update |
| cpsm_sync_update | Apply multiple update txns to location |
| cpsm_read_loc_list | Read list of locations and states |
| cpsm_sync_loc_list | Sync location list |
| cpsm_merge_loc_list | Attempt to merge my location list with other location list |
| cpsm_sync_finished | Remote machine is notifying us that a sync_upto_ptid has completed |
| cpsm_request_merge | Request a merge of this location with the central server |
| cpui_init | Initialize internal structures |
| cpui_shutdown | Shutdown CPUI subsystem |
| cpui_execute_txn | Execute update txn at a local location |
| cpui_apply_update_list_to_db | Apply an update list to an OP database |
| cpui_commit | Commit all txns at location |
| cpui_flush | Flush all txns to object database at location |
| cpui_replay_logged_transactions | Replay transactions from the log that have not been committed to OP |
| cp_bg_init | Initialize CP_BG subsystem |
| cp_bg_shutdown | Shutdown CP_BG subsystem |
| cp_bg_handle_distributed_request | Handle a request that requires remote communication |
| cp_bg_notify_close_txn | Notify CP_BG of a closed transaction |
| cp_bg_notify_commit | Notify CP_BG that all txns are committed at a location |
| cp_bg_attempt_send_flush | Attempt to send out and flush txns |
| cp_bg_notify_load | Notify CP_BG of a newly loaded DB |
| cp_bg_notify_unload | Notify CP_BG of a newly unloaded DB |
| cp_bg_flush_upto_ptid | Force all transactions upto the specified ptid to the iuigrated state |

The location distributor 78 in each replica manager 46 and the location state processor 80 are used to determine the storage locations of database entries. In one embodiment, the location state processor 80 uses a cache of the current state of locations and maintains state information on the merging process. The location state processor 80 is responsible for processing remote requests which pertain to the location list.

All locations that are up at any time within a sync group are in either the ACTIVE or MERGE location sets. The ACTIVE location set contains all locations that are in sync with the local location up to certain sync watermarks. The MERGE location set contains all nodes that are not in sync with the local location, either through not having updates the active set does have, or through having updates the active set does not have.

Locations in the MERGE set enter the ACTIVE set through the two-way merging process described above, under control of the consistency distributor 74 and the consistency processor 76. Once in the ACTIVE set, a location should never leave it until the location goes down.

Each location continuously sends out its local updates to other members of its active location set as part of the merging process. The PTID in a location's log that was last sent out in this manner is called the location's "low watermark" PTID. For a location to enter the active set it must have all PTIDS in its local log up to the low watermark PTID; only the merging process used to move a location from the MERGE to the ACTIVE location set is capable of propagating early transactions. Each location also maintains a "high watermark" PTID which is the last transaction (in local log order) that has been committed, and is thus a candidate for sending out in a background sync update.

The replica managers 46 track the last transaction sequence number made by every location up to the low watermark PTID in order to know whether a location is up to date with another location's low watermark. The log ordering may be different in different locations, up to an interleave.

One embodiment of the location state processor 80 provides functionality according to the following interface:

| | |
|---|---|
| ls_init | Initialize LS |
| ls_shutdown | Shutdown LS |
| ls_close_db | Clear out all entries for a database |

| | |
|---|---|
| ls_allocate_new_lid | Allocate a new location identifier for use by a new replica |
| ls_add | Add a new location |
| ls_remove | Remove a location |
| ls_modify_local_tid | Modify a location entry's local transaction identifier (sequence number) |
| ls_modify_state | Modify a location entry's state |
| ls_get_loc_list | Get list of locations |
| ls_get_loc_sync_list | Get list of locations for syncing |
| ls_get_next_loc | Get next location |
| ls_get_first_in_loc_list | Get first location in list that is in current location set |
| ls_get_loc_entry | Get location entry given lid (location identifier) |
| ls_get_first_ref_loc | Get nearest reference location in provided list |
| ls_get_first_ref_loc_in_list | Get first reference location in provided list |
| ls_get_lock_loc | Get lock location for location set |
| ls_higher_priority | Determine which location has highest priority |
| ls_complete_merge | Complete the merge process |
| ls_set_sync_watermarks | Set the high and low watermark PTIDs used in syncing and merging |

The object distributor 82 manages ACLs and otherwise manages access to objects in the database. In one embodiment, the object distributor 82 provides functionality according to this interface:

```
typedef void* ndr_od_db handle; //open database handle
//lint -strong(AJX,ndr_od_txn_id)
//object distributor transaction instance identifier
typedef void* ndr_od_txn_id;
#define NDR_OD_INVALID_TXN_ID (ndr_od_txn_id)0
typedef struct //Txn info returned by NdrOdGetTxnInfo
{
    ndr_od_db_handle      db;         /* database */
    ndr_dodb_session_type session;    /* session */
} ndr_d_txn_info;
//Start a new clash txn for this session
ndr_ret EXPORT
NdrOdStartClashTxn(
    ndr_od_db_handle      db_handle,
    /* -> Handle to the open DB */
    ndr_dodb_session_type session,    /* ->session */
    ndr_od_txn_id         *txn_id);   /* <- txn id */
//Find out what databases are available
ndr_ret EXPORT
NdrOdEnumerateDBs(
    ndr_od_enum_flags    flags,
    /* -> Determines which databases are included in search */
    ndr_os_db_name       search_name,
    /* -> The database name (may be wild) */
    ndr_os_db_type_name  search_type,
    /* -> The database type (may be wild) */
    ndr_dodb_database_id_type  search id,
    /* -> The database id (may be wild) */
    ndr_os_db_name       name,
    /* <- The database name */
    ndr_os_db_type_name  type,
    /* <- The database type */
    ndr_dodb_database_id_type  *id,
    /* <- The database id */
    UINT16               *index);
    /* <-> Set to 0 to start else use
    previous returned value */
//Start a new txn for this session
ndr_ret EXPORT
NdrOdStartTxn(
    ndr_od_db_handle     db_handle,
    /* -> Handle to the open DB */
    ndr_dodb_session_type session,
    /* -> session */
    ndr_od_txn_id        *txn_id);
    /* <- txn id */
```

The interface includes NdrOdCloseTxn( ), which closes updates for the current transaction and causes all updates since the last NdrOdStartTxn( ) call to be applied. Either all updates will be applied, or none will be applied. NdrOdCloseTxn( ) does not commit the updates, that is, they are not written to disk. NdrOdCommit( ) is used to commit closed updates to disk. However, after calling NdrOdCloseTxn( ), no further updates may be applied in the transaction. This function is also where all the locking and updates previously cached actually get done. Consequently, most locking and/or consistency errors are reported here (after synchronization) so that the transaction can be retried:

```
ndr_ret EXPORT
NdrOdCloseTxn(ndr_od_txn_id    txn_id);    /* -> txn_id */
```

The NdrOdEndTxn( ) function ends the current transaction and executes an implicit NdrOdCloseTxn( ). No error is returned if no transaction is currently open:

```
ndr_ret EXPORT
NdrOdEndTxn(ndr_od_txn_id    txn_id);    /* -> txn id */
```

The NdrOdCommit function commits all previously closed transactions for the session to disk:

```
ndr_ret.EXPORT
NdrOdCommit(
    ndr_od_db_handle      db,       /* > DB to commit */
    ndr_dodb_session_type session); /* > session */
The interface also includes the following functions:
//Abort current txn
ndr_ret EXPORT
NdrOdAortTxn(ndr_od_txn id    txn_id);    /* > txn_id */
//Get inf o on current txn
ndr_ret EXPORT
NdrOdGetTxnInfo(
    ndr_od_txn_id     txn_id,    /* -> txn_id */
    ndr_od_txn_info*  txn_info); /* < txn info */
//Lookup an object using parent Distributed Object Identifier
//(DOID; encodes location info to assist in sending distributor
//requests to the right machine; includes UOID) & sibling key
or
//using global key; the key value MUST be a contiguous
structure.
ndr_ret EXPORT
NdrodLookupByKey(
    ndr_od_txn_id     txn_id,    /* -> txn_id */
    ndr_do_db_access_rights_type rights_needed_on_parent,
    /* -> rights needed on parent */
    ndr_os_class      class_id,
    /* -> Class id. of superclass to match*/
    /* Acts as filter when key contains wildcard. */
    ndr_dodb_doid_class* parent_doid,   /* -> Parent DOID
*/
    ndr_os_attribute  key_id,
    /* -> Type of unique key */
    UINT16            key_length,
    /* -> Length, in bytes, of the key value */
    VOID*             key,       /* ->Key value
*/
    ndr_dodb doid_class* doid);
    /* <- Pointer to returned DOID of object */
//Lookup an object using DOID
//This checks the existence of the object and updates its DOID
```

```
ndr_ret EXPORT
NdrOdLookup(
    ndr_od_txn_id      txn_id,    /* ->txn_id */
    ndr_dodb_access_rights_type rights_needed_on_parent,
    /* -> rights needed on parent */
    ndr_dodb_doid_class*    doid,    /* -> DOID */
    ndr_dodb_doid_class* new_doid);
    /* <- Updated DOID of object */
//Lookup an object's parent using DOID.
ndr_ret EXPORT
NdrOdLookupParent(
    ndr_od_txn_id      txn_id,    /* -> txn_id */
    ndr_dodb_access_rights_type rights_needed_on_parent,
    /* -> rights needed on parent */
    ndr_dodb_doid_class* doid,    /* -> DOID */
    ndr_dodb_doid_class* parent_doid);
    /* <- Parent DOID of object */
//Read an object using parent DOID and sibling key or using
//global key. It's always OK to read an object with an out of
//date parent doid as the parent's lid is not used to get the
//reference location. The key value MUST be a contiguous
//structure
ndr_ret EXPORT
NdrOdReadByKey(
    ndr_od_txn_id      txn_id,    /* -> txn id */
    ndr_dodb_access_rights_type rights_needed_on_parent,
    /* > rights needed on parent */
    ndr_os_class       class_id,
    /* ->Class id. of superclass to match */
    /*    and superclass structure to be returned */
    ndr_dodb_doid_class* parent_doid, /* -> Parent DOID */
    ndr_os_attribute    key_id, /* -> Type of unique key */
    UINT16             key_length,
    /* -> Length, in bytes, of the key value */
    VOID*              key,    /* -> Key value */
    UINT16             max_length,
    /* -> Max length of data read */
    UINT16*            length,
    /* <- Final length of data read */
    ndr_os_object*     object);
    /* -> Pointer to object buffer */
//Read an object using DOID
ndr_ret EXPORT
NdrOdRead(
    ndr_od_txn_id      txn id,    /* -> txn id */
    ndr_do_db_access_rights_type rights_needed_on_parent,
    /* -> rights needed on parent */
    ndr_os_class       class_id,
    /* -> Class id. of superclass to match */
    /*    and superclass structure to be returned */
    ndr_dodb_doid_class* doid,    /* -> DOID */
    UINT16             max_length,
    /* -> Max length of data read */
    UINT16*            length,
    /* <- Final length of data read */
    ndr_os_object*     object);
    /* > Pointer to object buffer */
```

An NdrOdReadn( ) function which reads multiple objects using parent DOID and wildcards behaves as if none of the updates in the transaction have been applied. Interpretation of wildcard values in the key is done by registered keying functions. NdrOdReadn( ) reads either up to max_objects, or up to the maximum number of objects that will fit in the max_length object buffer:

```
ndr_ret EXPORT
NdrOdReadn(
    ndr_od_txn_id      txn_id,    /* -> txn_id */
    ndr_do_db_access_rights_type rights_needed_on_parent,
    /* -> rights needed on parent */
    ndr_os_class       class id,
    /* -> Class id. of superclass to match
    and superclass structure to be returned */
    ndr_os_class       read_as_class,
    Class id. target objects are to be read as */
    ndr_dodb_doid_class* parent doid,    /* -> Parent DOID */
    ndr_os_attribute    key_id,    /* -> Type of unique key */
    UINT16             key_length,
    /* -> Length, in bytes, of the key value */
    VOID*              key,
    /* ->Key value to match, can contain wildcard.
    NULL implies TrLatch all objects under parent containing
    the key id */
    UINT16             max_length,
    /* ->Max length of data read */
    UINT16*            length,
    /* <- Final length of data read */
    ndr_dodb_object_list*    object_list,
    /* -> Pointer to object buffer */
    UINT16             max_objects,
    /* -> Max number of objects read. Use OD_MAX_OBJECTS to
    read max that will fit in buffer */
    ndr_dodb_context_type*    context);
    /* <> ->    set to DODB_CONTEXT_START to start a new read,
    or a previously returned context to continue a previous
    read. <-    set to DODB_CONTEXT_END if all objects read,
    or a value that can be used to continue reading at the
    next object */
#define NDR_OD_MAX_OBJECTS    0xFFFF
```

The NdrOdLock( ) function explicitly adds an exclusive or shared lock to an object using the object's DOID. The lock call is called implicitly for all updates, but should be called explicitly if read locks are required. The lock is only taken when the transaction is initially executed. It is not executed when the update is merged. The lock is applied at the end of a transaction. If it fails the transaction is aborted and should be re-tried by the caller. One embodiment does not utilize locks to control concurrency but instead relies on retries and clash handling:

```
ndr_ret EXPORT
NdrOdLock(
    ndr_od_txn_id      txn id,    /* -> txn_id */
    ndr_dodb_doid_class* doid,    /* -> Objects's DOID */
    BOOLEAN            is_exclusive);
    /* -> TRUE => take exclusive lock */
    The interface also includes:
//Add agent defined lock to object
ndr_ret EXPORT
NdrOdAddAgentLock(
    ndr_od_txn_id      txn id,    /* -> txn_id */
    ndr_dodb_doid_class* doid,    /* -> Objects's DOID */
    ndr_dodb_lock_type    lock_type,
    /* -> Type of lock */
    ndr_dodb_lock_flags_type lock_flags,
    /* -> Flags that allow multiple locks to be taken
    in single call. Each bit corresponds to a separate
    lock, e.g. used for read/write flags on file open */
    ndr_dodb_lock_deny_flags_type deny_flags);
    /* -> Bits set that correspond to lock_flags bits
    causes the corresponding lock to be denied */
//Remove agent defined lock
ndr_ret EXPORT
NdrOdRemoveAgentLock(
    ndr_od_txn id      txn_id,    /* -> txn_id */
    ndr_dodb_doid_class* doid,    /* -> Objects's DOID */
    ndr_dodb_lock_type    lock_type);
    /* -> Type of lock */
```

The following four calls are used to append various types of updates onto an open transaction. Any of them may return NDR_OK indicating success, NDR_CD_EXCEEDED_TXN_LIMITS indicating that transaction limits have been exceeded, or some other error indicator. In the case of exceeded transaction limits the transaction state will not have been changed and the failed call will have had no effect. The caller is expected to commit or abort the transaction as appropriate. In all other error cases the transaction is automatically aborted before returning the error to the caller:

```
//Modify a single attribute in a previously read object
//The object distributor caches the modifications and only
//applies them at close txn time
ndr_ret EXPORT
NdrOdModifyAttribute(
    ndr_od_txn_id      txn_id,      /* -> txn_id */
    ndr_dodb_access_rights_type rights_needed_on_parent,
    /* -> rights needed on parent */
    ndr_dodb_doid_class* doid,
    /* ->      DOID of previous read version of object.
    Used to verify object has not been modified by another
    user since previously read */
    ndr_os_attribute       attribute_id,
    /* -> Identifies attribute to be modified
    VOID*       value);        /* -> New attribute value */
//Add a new object
//The DOID attribute does not need to be filled in by the
caller.
//The DOID will be set up before writing the object to the
//database.
ndr_ret EXPORT
NdrOdAdd(
    ndr_od_txn_id      txn_id,      /* -> txn_id */
    ndr_dodb_access_rights_type rights_needed_on_parent,
    /* -> rights needed on parent */
    ndr_dodb_doid_class* parent doid,    /* -> Parent DOID */
    ndr_os_class       class_id,
    /* -> Class id of object */
    ndr_os_object*       object)
    /* -> Pointer to agent object */
//Remove an object using DOID
ndr_ret EXPORT
NdrOdRemove(
    ndr_od_txn_id      txn_id,      /* -> txn_id */
    ndr_dodb_access_rights_type rights_needed_on_parent,
    /* -> rights needed on parent */
    ndr_dodb_doid_class* doid);     /* -> DOID */
//Move an object using DOID
ndr_ret EXPORT
NdrOdMove(
    ndr_od_txn_id      txn_id,      /* -> txn_id */
    ndrdodb_access_rights_type rights_needed_on_parent,
    /* -> rights needed on parent */
    ndr_dodb_doid_class* doid,     /* -> DOID */
    ndr_dodb_doid_class* target_parent_doid);
    /* -> Target parent DOID */
//Set a marker in an open transaction. The state of the
//transaction at the time the marker is set can be reverted
//to at any time before the transaction is closed by
//calling NdrOdRevertToMarker().
//Only the last marker in a transaction is significant.
//This call may return NDR_CD_EXCEEDED_TXN_LIMITS which
//should be treated as for the update appending calls above
ndr_ret EXPORT
NdrOdSetMarker(ndr_od_txn_id      txn id);       /* -> txn_id */
//Revert a txn's state to the last previously marked state
ndr_ret EXPORT
NdrOdRevertToMarker(ndr_od_txn_id txn_id);  /* -> txn_id */
//Add a <user-id, rights-mask> pair to an object's
//access rights, overwriting any previous rights-mask for
//that user
ndr_ret EXPORT
NdrOdAddAccessRight(
    ndr_od_txn_id     txn id,      /* -> txn_id */
    ndr_dodb_doid_class*      doid,      /* -> Object DOID */
    ndr_dodb_auth_id_type      user,
    /* -> User to whom rights are to be granted */
    ndr_dodb_access_rights_type rights);
    /* -> Rights to be granted to that user */
//Remove any <user-id, rights-mask> pair from an object's
//access rights for a given user-id
ndr_ret EXPORT
NdrOdRemoveAccessRight(
    ndr_od_txn_id      txn_id,      /* -> txn_id */
    ndr_dodb_doid_class*      doid,      /* -> Object DOID */
    ndr_dodb_auth_id_type       user);
    /* -> User whose rights are to be revoked */
```

-continued

```
//Get the array of all <user-id, rights-mask> pairs for an
object
ndr_ret EXPORT
NdrOdGetAccessRights(
    ndr_od_txn_id      txn id,      /* -> txn_id */
    ndr_dodb_doid_class* doid,       /* -> Object DOID */
    UINT16*        acl_count,
    /* <- Number of ACL entries for that object */
    ndr_dodb_acl_element_type* acl);
    /* <- Rights information for that object */
//Get the effective access rights for the current session
//for an object
ndr_ret EXPORT
NdrOdGetEffectiveAccessRight(
    ndr_od_txn_id      txn_id,      /* -> txn_id */
    ndr_dodb_doid_class*      doid,     /* -> Object DOID */
    ndr_dodb_access_rights_type* rights);
    /* <- Effective rights for the current session */
//Convert UOID to DOID
ndr_ret EXPORT
NdrOdConvertUoid2Doid(
    ndr_os_class      class_id,
    /* -> Class id. of object */
    ndr_dodb_uoid_type*      uoid,      /* -> UOID */
    ndr_dodb_doid_class*      doid);     /* <- Updated DOID */
//Convert UOID to DOID
ndr_ret EXPORT
NdrOdConvertUoid2LocalDoid(
    ndr_os_class      class_id,
    /* -> Class id. of object */
    ndr_dodb_lid_type      location,
    /* -> Location on which object exists */
    ndr_dodb_uoid_type*      uoid,      /* -> UOID */
    ndr_dodb_doid_class*      doid);     /* <- Updated DOID */
```

The object processor 86 provides a local hierarchical object-oriented database for objects whose syntax is defined in the object schema 84. In one embodiment, the object processor 86 is built as a layered structure providing functionality according to an interface in the structure which is described below. The embodiment also includes a module for object attribute semantics processing, a set of global secondary indexes, a hierarchy manager, a B-tree manager, a record manager, and a page manager. Suitable modules and managers are readily obtained or constructed by those familiar with database internals. A brief description of the various components follows.

The page manager provides functionality according to a logical file interface of free-form fixed length pages addressed by logical page number. Rollback and commit at this level provide anti-crash recovery.

The record manager provides for the packing of variable length keyed records into fixed length pages.

The B-tree manager uses the facilities of the record and page managers to provide general B-trees supporting variable length records and variable length keys.

The hierarchy manager imposes a hierarchical structure on records by use of structured B-tree keys and a global UOID->full name index.

The secondary index manager provides generalized global indexing capabilities to records.

The attribute manager interprets the schema 84 in order to raise the interface of the object processor 86 from a record-level to an object-level interface.

The interface module of the object processor 86 uses lower level interfaces to provide functionality according to the following interface:

```
op_init            Initializes object processor
op_shutdown        Shuts down object processor
```

-continued

| | |
|---|---|
| op_add_database | Creates a new volume |
| op_mount_database | Mounts a specified volume for use |
| op_dismount_database | Dismounts the specified volume |
| op_remove_database | Removes a specified volume (permanently) |
| op_read | Read an object by UOID |
| op_readn | Read one or more objects with wildcards |
| op_execute_update_list | Apply one or more updates |
| op_commit | Commit updates to a specified volume |
| op_rollback | Rollback to the last committed state |
| op_free_inversion_list | Free up an inversion list returned from update execution |
| op_clear_stats | Clear object processor statistics |
| op_dump_stats | Dump statistics to the log |

Due to higher level requirements of trigger functions in a set of trigger function registrations 94, in one embodiment it is necessary to have the old values of modified attributes available on a selective basis. This is done by means of a 'preservation list' produced by op_execute_updates( ). The preservation list contains an update list specifying old attribute values for all executed updates that require it (as determined by a callback function), together with pointers to the original causative updates. These updates may not actually be present in the input update list, as in the case of an object removal that generates removes for any descendant objects it may have. Preservation lists reside in object processor 86 memory and must thus be freed up by the caller as soon as they are no longer needed.

The transaction logger 88 provides a generic transaction log subsystem. The logs maintained by the logger 88 provide keyed access to transaction updates keyed according to location identifier and processor transaction identifier (PTID). In one embodiment, a non-write-through cache is used to batch uncommitted transaction updates.

The transaction logger 88 is used by the consistency processor 76 to support fast recovery after a crash. Recovery causes the target database to be updated with any transactions that were committed to the log by the logger 88 but were not written to the target database. The log file header contains a "shutdown OK" flag which is used on startup to determine if recovery is required for the location.

The transaction logger 88 is also used by the consistency processor 76 to support fast synchronization. The update log created by the logger 88 is used to replay the updates from one location to a second location using minimal disk and network 10 transfers.

The file distributor 90 distributes file contents to appropriate locations in the network 10. A file processor 92 supports each file distributor 90 by carrying out requested read, write, lock, or other operations locally.

The file distributor 90 hides from agents the complexities caused by the distributed nature of files. To the extent possible, the interface portion of the file distributor 90 resembles file system interfaces that are familiar in the art. An open file is denoted by a numeric fork_id and functions are provided to read, write, open, and otherwise manipulate and manage files and their contents.

However, a class in the schema 84 can be given a REPLICATED_FILE property. Whenever an object of such a class is created in the database, a distributed file is created by the file distributor 90 and file processor 92 to hold the file contents associated with that object. For instance, the Hierarchy Agent might create such an object to denote a leaf node in the directory hierarchy. In short, in one embodiment the file distributor 90 neither has nor needs an explicit externally called mechanism for creating files.

Moreover, the distributed file is deleted from storage when the corresponding object is deleted from the database. The locations at which the file is stored are precisely those at which the object exists. When a file with more than one replica 56 is modified and closed, the file distributors 90 and file processors 92 at the various locations holding the replicas 56 ensure that all replicas 56 of the file receive the new contents. It is not necessary for the agent to expressly manage any aspect of file content distribution.

A distributed file is identified by the UOID of the corresponding object; no built-in hierarchical naming scheme is used. A transaction identifier is also required when opening a file, to identify the session for which the file is to be opened. In one embodiment, the file distributor 90 and file processor 92 provide functionality according to the following interface:

```
//An ndr_fd_fork_id is the Id by which an FD open fork is known
typedef SINT16 ndr_fd_fork_id;
#define  NDR_FD_NOT_A_FORK_ID (-1)
//An ndr_fd_open_mode is a bit-mask which specifies whether a
//fork is open for reading and/or writing
typedef UINT16 ndr_fd_open_mode;
#define  NDR_FD_OPEN_READ_MODE          0x0001
#define  NDR_FD_OPEN_WRITE_MODE         0x0002
#define  NDR_FD_OPEN_EXCL_MODE          0x0004
#define  NDR_FD_OPEN_EXTERNAL_MODES     0x0007
//The remaining open modes are private to the replica managers
#define  NDR_FD_OPEN_SYNC_MODE          0x0008
#define  NDR_FD_OPEN_CLOSE_ON_EOF_MODE  0x0010
#define  NDR_FD_OPEN_READ_NOW           0x0020
```

In one alternative embodiment, opening a file with an NdrFdOpenFile( ) function returns pointers to two functions together with a separate fork_id for use with these two functions only. These pointers are of the type ndr_fd_io_ function, and may be used as alternatives to NdrFdReadFile( ) and NdrFdWriteFile( ) when accessing that open file only. The functions should be at least as efficient as NdrFdReadFile( ) and NdrFdWriteFile( ) and will be significantly faster when the file access is to a local location. Their use does require that the caller maintain a mapping from the open fork id onto these function pointers. For this reason, NdrFdReadFile( ) and NdrFdWriteFile( ) should always be available for all open files in this alternative embodiment:

```
typedef ndr_ret EXPORT (*ndr_fd_io_function)(
    ndr_fd_fork_id    fork_id,    /* -> Id of open fork */
    UINT32            offset,
    /* -> Offset at which to start reading */
    UINT16*           length,
    /* <-> desired length on entry, actual length on
    exit. These will only differ if an error
    is encountered (such as end of file) */
    UINT8*            data,
    /* <-> Data read or written */
    ndr_od_txn_id     txn_id);    /* -> txn_id */
```

A "clash" occurs during synchronization when two desired changes to the database are inconsistent. Clashes arise from "independent" updates, namely, updates performed on separate replicas 56 while the computers holding the replicas 56 were disconnected. Thus, clashes always take place between a pair of "clashing updates" which together define a "clash condition." A "repairing update" is an update that removes a clash condition caused by a clashing update.

A "transient clash" is a clash that is not present in the final states of the two replicas 56 being merged. Transient clashes only arise when log-based or hybrid merging is used. For instance, suppose two users each create a file of a given name at two locations 36, 38 while those locations are disconnected. The user at the first location 36 then deletes (or renames or moves) the file in question before reconnection such that it no longer clashes with anything on the second location 38. On merging the replicas 56 of the two locations 36, 38, the original add update for the file from the first location 36 will clash with the replica 56 of the second location 38, yet the final result of applying the update stream from the first location 36 to the replica 56 on the second location 38 is a state that is compatible with that replica 56.

By contrast, "persistent clashes" create inconsistencies that are present in the final states of two replicas 56. A clash whose type is unknown is a "potential clash."

A "file contents clash" occurs when a file's contents have been independently modified on two computers 28, or when a file has been removed from one replica 56 and the file's contents have been independently modified on another replica 56.

An "incompatible manipulation clash" occurs when an object's attributes have been independently modified, when an object has been removed in one replica 56 and the object's attributes have been modified in another replica 56, when an object has been removed in one replica 56 and moved in the hierarchy in another replica 56, when a parent object such as a file directory has been removed in one replica 56 and has been given a child object in another replica 56, or when an object has been independently moved in different ways. Thus, although clashes are discussed here in connection with files and the file distributor 90, clashes are not limited to updates involving files.

A "unique key clash" occurs when two different objects are given the same key and both objects reside in a portion of the database in which that key should be unique. In a database representing a file system hierarchy, for instance, operations that add, move, or modify files or directories may create a file or directory in one replica 56 that clashes on reconnection with a different but identically-named file or directory in another replica 56.

A "permission clash" occurs when a change in file access or modification permissions that is made to a central server replica 56 would prohibit an independent update made to a mobile or client computer replica 56 from being applied to the server replica 56. A permission clash is an example of an "external clash," namely, a clash detected by reference to a structure external to the database. Permission clashes and other external clashes may be detected by trigger functions.

A "grouped attribute" is a database object attribute that is associated with other database object attributes such that changing the value of any attribute in a group creates a clash with the other attributes in the group. For instance, filename and rename-inhibit attributes are preferably grouped together, while filename and file-access-date attributes are preferably not grouped together. Without attribute grouping, a change to any attribute of an object is assumed to clash with a change to any other attribute of the object or another change to the same attribute.

"Eliminating a clash" means identifying the basis for the clash and eliminating it. "Recovering from a clash" means identifying the basis for the clash and either eliminating that basis or presenting alternative resolutions of the clash to a user to choose from. "Regressing an update" means undoing the update on at least one replica 56. Creating a "recovery item" means creating a duplicate object in a shadow database and then remapping uses of the recovery item's key so that subsequent updates are performed on the recovery item instead of the original object. If the database represents a file system hierarchy, recovery items may be gathered in a "single directory hierarchy" or "recovery directory" that contains a directory at the root of the volume, recovered items, and copies of any directories necessary to connect the recovered items properly with the root.

A clash handler function of one of the types below can be registered with the file distributor 90 for a database type to be called whenever the file distributor 90 detects a clash caused by disconnected modification or removal of a file's contents. The parameters are those of a regular clash handler plus the object DOID with NDR_OS_CLASS_FLAG_HAS_PARTIALLY_REPLICATED_FILE property (the file object defined by the object schema 84) and possibly a duplicated object return:

```
//Call back to a husk in respect of clashes detected at the
//database level
typedef ndr_ret EXPORT (*ndr_fd_object_clash_fn)(
    ndr_od_db_handle    db,      /* -> Database */
    ndr_dodb_session_type    session,
    /* -> session to use in od_start_txn */
    ndr_od_clash_info*    info,
    /* -> Information on clash */
    ndr_dodb_doid_class*    old_doid,
    /* -> DOID of file with clashing contents */
    ndr_dodb_doid_class*    new doid);
    /* <- Doid of duplicated file */
//Call back to the husk in respect of clashes detected at the
//filesystem level
// (via pre trigger functions)
typedef ndr_ret EXPORT (*ndr_fd_filesys_clash_fn)(
    ndr_od_db_handle    db,      /* -> Database */
    ndr_dodb_session_type    session,
    /* -> session to use in od_start_txn */
    ndr_od_clash_info*    info,
    /* -> Information on clash */
    ndr_dodb_doid_class*    doid);
    /* -> DOOD of file with clashing contents */
```

A parameter block such as the following is passed to clash handling functions to provide them with information about the clash:

```
typedef struct
{
    ndr_dodb_ptid_type*    ptid;
    /* -> PTID of clashing txn */
    ndr_od_clash_type    clash_type;
    /* -> Clash type */
    ndr_os_class    class_id;
    /* -> Class id of object causing the clash */
    ndr_os_attribute    attr_id;
    /* -> Attr id of object causing the clash */
    ndr_dodb_update_list*    update list;
    /* -> Update list of transaction */
    ndr_dodb_update*    update;
    /* -> Update causing clash (always a pointer
       into 'update_list' */
    BOOLEAN              is_higher_priority;
    /* -> Relative priority of location
       to which update is being applied.
       TRUE=> Applying to location with higher
       priority (e.g. to location set with
       central location) */
    void*            agent_merge_info;
    /* -> Value which is reserved for (arbitrary)
       use by agent clash handlers. It is
       guaranteed to be set to NULL on the
       first clash of a merge, and preserved
       for all subsequent clashes within that
       merge */
} ndr_od_clash_info;
```

A close handler function of type ndr_fd_close_fn can be registered with the file distributor 90 for a database type to be called whenever the file distributor 90 closes a modified local copy of the file contents, passing the new length and modification date/time and user identifier:

```
typedef ndr_ret EXPORT (*ndr_fd_close_fn)(
    ndr_od_db_handle      db,        /* -> Database */
    ndr_dodb_session_type session,
    /* -> session to use in od_start_txn */
    ndr_os_class          class_id,
    /* -> Class ID of file */
    ndr_dodb_uoid_type*   uoid,      /* -> UOID */
    UINT32                length,
    /* -> length of closed file */
    UINT16                time,
    /* -> modification time */
    UINT16                date,
    /* -> modification date */
    UINT32                updator);
    /* -> modification user */
```

A creation handler function of type ndr_fd_creation_fn can be registered with the file distributor 90 for a database type to be called whenever the file distributor 90 creates a local copy of the file contents. This allows the replica manager 46 on a central server computer 28 to update the master copy of the file to reflect the attributes of the file created while disconnected:

```
typedef ndr_ret EXPORT (*ndr_fd_creation_fn)(
    ndr_od_txn_id       txn_id,    /* -> txn_id */
    ndr_os_class        class_id,
    /* -> Class ID of file */
    ndr_dodb_uoid_type* uoid);     /* -> UOID of file */
```

The file distributor 90 embodiment also provides the following:

```
//Return aggregated information about all volumes
ndr_ret EXPORT
NdrFdVolumeInfo(
    ndr_od_txn_id    txn_id, /* -> txn_id   */
    UINT32*          cluster_size,
    /* <- Number of bytes per cluster */
    UINT16*          total_clusters,
    /* <- Total number of clusters   */
    UINT16*          free_clusters);
    /* <- Number of free clusters    */
//Add a file
ndr_ret EXPORT
NdrFdAddFile(
    ndr_od_txn_id    txn_id,  /* -> txn_id */
    ndr_dodb_doid_
class* doid,
    /* -> Uoid of file cre-
ated */
    UINT32           length);
    /* -> Length of existing file (0 when new) */
//Remove a file
ndr_ret EXPORT
NdrFdRemoveFile(
    ndr_od_txn_id    txn_id,  /* -> txn_id */
    ndr_dodb_uoid_type* uoid);
    /* -> Uoid of file removed */
//Open a file for reading or writing by a task
ndr_ret EXPORT
NdrFdOpenFile(
    ndr_od_txn_id    txn_id, /* -> txn_id */
    ndr_os_class     class_id,
    /* -> Class ID of file to open */
    ndr_dodb_uoid_type uoid,
    /* -> Uoid of file to open */
    ndr_fd_open_mode open_mode,
    /* -> Open for read and/or write? */
    ndr_fd_fork_id*  fork_id,
```

```
    /* <- FD Fork Id of open file */
    BOOLEAN          is_create,
    /* -> TRUE if open as part of create    */
    ndr_fd_io_function* read_function,
    /* <- Function to be used for READ operations */
    ndr_fd_io_function* write_function,
    /* <- Function to be used for WRITE operations */
    ndr_fd_fork_id*  io_fork_id,
    /* <- FD Fork Id used
with above two functions
(only) */
    UINT16*          num_forks_remaining);
    /* <- Number of forks remaining to be opened
       on same machine    */
//Read from a file
ndr_ret EXPORT
NdrFdReadFile(
    ndr_od_txn_id    txn_id,    /* -> txn_id */
    ndr_fd_fork_id   fork_id,   /* -> Id of open fork */
    UINT32           offset,
    /* -> Offset at which to start reading */
    UINT16           req_length,
    /* -> Number of bytes requested to read */
    UINT8*           data,      /* <- Data read */
    UINT16*          act_length);
    /* <- Actual number of bytes read */
//Write to a file
ndr_ret EXPORT
NdrFdwriteFile(
    ndr_od_txn_id    txn_id,    /* -> txn_id */
    ndr_fd_fork_id   fork_id,   /* -> Id of open fork */
    UINT32           offset,
    /* -> Offset at which to start writing */
    UINT16           req_length,
    /* -> Number of bytes requested to write */
    UINT8*           data);     /* -> Data to be written */
//Get the current length of an open file
ndr_ret EXPORT
NdrFdGetOpenFileLength
    ndr_od_txn_id    txn_id,    /* -> txn_id */
    ndr_fd_fork_id   fork_id,   /* -> Id of open fork *,
    UINT32*          length);
    <- Length of that open file */
//Lock or Unlock a range of bytes in an open file
ndr_ret EXPORT
NdrFdClearPhysicalRecord ( or NdrFdLockPhysicalRecord(
    ndr_od_txn_id    txn_id,    /* -> txn_id */
    ndr_fd_fork_id   fork_id,   /* -> Id of open fork */
    UINT32           offset,    /* -> Offset for lock */
    UINT32           req_length);
    /* -> Number of bytes requested to lock */
//Ensure a file's contents are on disk
ndr_ret EXPORT
NdrFdCommitFile(
    ndr_od_txn_id    txn_id,    /* -> txn_id */
    ndr_fd_fork_id   fork_id);  /* -> Id of open fork
*/
//Close a file, having completed reading and writing
ndr_ret EXPORT
NdrFdCloseFile
    ndr_od_txn_id    txn_id,    /* -> txn_id */
    ndr_fd_fork_id   fork_id);  /* -> Id of open fork
*/
//Given a UOID to a file or directory return its name
//in the specified namespace, along with its parent's UOID
ndr_ret EXPORT
NdrFdGetFilename(
    ndr_od_db_handle   db,
    /* ->   handle to current database */
    ndr_dodb_uoid type*  file_or_dir_id,
    /* ->   Uoid of object whose name is wanted */
    ndr_os_attr_property  namespace,
    /* ->   Namespace (e.g. DOS) of name wanted */
    void*              name_buffer,
    /* <-   Buffer to receive name */
    UINT16*            name_size,
    /* ->   Size of provided buffer */
    ndr_dodb_uoid_type* parent_dir_id);
    /* <-   Parent UOID of object (NULL at root) */
//Callback functions to be used with
```

```
//NdrFdRegisterChangedIdCallback
typedef_ndr_ret    EXPORT
(*NdrFdChangedIdCallback) (
      ndr_od_db_handle      db,           /* -> Database Id */
      ndr_os_class          class_id,
      /* -> Class ID of file or dir */
      ndr_dodb_uoid_type    *uoid,        /* -> Uoid of file or dir
*/
      UINT32                new_id);
      /* -> New Id allocated by underlying file system */
```

A NdrFdRegisterChangedIdCallback( ) function provides registration of a callback function to be called when a change to a file or directory's unique identifier is made. On a NetWare 4.x server this normally happens only when the file or directory is created by an internal file distributor 90 trigger function. However the identifier will be needed by agents for tasks such as directory enumeration. Because trigger functions cannot directly modify replicated objects, a record of the identifier change is queued within the file distributor 90 and the callback is made asynchronously:

```
ndr_ret EXPORT
NdrFdRegisterChangedIdCallback
      ndr_os_db_type handle      db_type, /* -> Database type */
      NdrFdChangedIdCallback     fn); /* -> Callback function */
```

The interface also provides the following:

```
//Register clash handlers for contents clashes for files held
in
//a database of the given type.
ndr_ret EXPORT
NdrFdRegisterClashHandlers
      ndr_os_db_type_handle   db_type, // -> Database type
      ndr_os_class            class_id,
      // -> Class ID of contents 'container' eg file
      ndr_fd_object_clash_fn  object_clash_fn,
      // -> Clash handler for dealing with conflicts
      // -> between objects (e.g. contents modification
      //     and removal)
      ndr_fd_filesys_clash_fn filesys_clash_fn,
      // -> Clash handler for conflicts that arise
      //     through some characteristic of the file
      //     system (e.g. access rights on delete)
      ndr_fd_filesys_clash_fn filesys_clash_fnl);
//Register a trigger-like routine to be called when a local
//replica of a file is modified. The routine takes the length
//and modification date/time of the local replica of the file.
ndr_ret EXPORT
NdrFdRegisterCloseHandler(
      ndr_os_db_type_handle   db_type, // -> Database type
      ndr_os_class            class_id,
      /* -> Class ID of file */
      ndr_fd_close_fn         close_fn);
      /* -> Clash handler to call */
//Register a trigger-like routine to be called when a local
//replica of a file is has been created. This allows the
//replica manager on a central server to update the
//server's master copy of the file to ref lect the attributes
//of the file created during the disconnection.
ndr_ret EXPORT
NdrFdRegisterCreationHandler(
      ndr_os_db_type_handle   db_type, /* -> Database type */
      ndr_os_class            class_id,
      /* -> Class ID of file */
      ndr_fd_creation_fn      creation_fn);
      /* -> Creation handler to call */
//De-register a clash or close or creation handler for
//contents clashes for files held in a database of the given
type
ndr_ret EXPORT
NdrFdDeRegisterClashHandler( or CloseHandler( or
      CreationHandler(
      ndr_os_db_type_handle   db_type, // -> Database type
      ndr_os_class            class_id); // -> Class ID of file
//Synchronize all the files to and from this client for the
//passed database. Return control when the files are up to
date.
ndr_ret EXPORT
NdrFdSynchronizeFiles(ndr_od_db_handle db);
//Called from pre trigger functions to check whether
//or not the current connection has sufficient
//per-user-rights to perform a particular operation
//on a particular file system object.
ndr_ret
NdrFdCheckRights(
      ndr_dodb_uoid_type*     file_uoid,
      // uoid of object reguiring rights to operation
      ndr od_db_handle        db,
      // database raising the pre trigger
      UINT16                  operation);
      // bits representing operation
//Note that a file has been locally modified, setting
//modification info and triggering propagation onto other
//replicas.
ndr_ret EXPORT
NdrFdNoteFileModified
      ndr_od_txn_id           txn_id, /* -> txn_id */
      ndr_dodb_doid_class*    file_doid);
```

The trigger function registrations 94 identify trigger functions that are provided by agents and registered with the object distributor 82. A registered trigger function is called on each event when the associated event occurs. Suitable events include object modification events such as the addition, removal, movement, or modification of an object. Because the trigger functions are called on each location, they can be used to handle mechanisms such as file replication, where the file contents are not stored within the target database, while ensuring that the existence, content, and location of the file tracks the modifications to the target database. All objects must have been locked, either implicitly or via NdrOdLock( ), in the triggering transaction before the corresponding trigger function is called, and other objects may only be modified if the trigger function is being called for the first time at the location in question.

In an alternative embodiment, the replica manager 46 comprises a NetWare Loadable Module ("NLM") and an NWAdmin snap-in module. The NLM uses hooks in the NetWare file system 48 to intercept updates to the local NetWare storage 54, and uses standard NetWare file system Application Programmer's Interface ("API") calls to update the storage 54 when synchronizing. The architecture is symmetric, with the same code running on all computers 28.

The NLM has three major internal subsystems. An environment subsystem provides portability by separating the other two internal subsystems from the operating system environment such as the Windows NT or UNIX environment. The environment subsystem provides execution, debugging, scheduling, thread, and memory management services. A Distributed NetWare ("DNW") subsystem implements NetWare semantics by intercepting NetWare file system calls and calls from a DNW API and making corresponding requests of a dispatch layer discussed below. A distributed responder subsystem implements the replica manager 46 to provide a distributed disconnectable object database which supports replication, transaction synchronization, and schema-definable objects, including file objects, as described herein.

An application layer contains application programs and the NWAdmin snap-in. These programs interface with the replica manager 46 either by calling an API or by attempting to access the storage device 54 and being intercepted. An intercept layer in the replica manager 46 intercepts and routes external requests for file system updates that target a replica 56. A dispatch later receives the routed requests and dispatches them to an appropriate agent 44.

The agents 44, which have very little knowledge of the distributed nature of the database, invoke the consistency distributor 74, location distributor 78, object distributor 82, and/or file distributor 90. For example, a directory create would result in an object distributor 82 call to NdrOdAdd( ) to add a new object of type directory.

In contrast to the agents 44, the distributors 74,78,82, and 90 have little semantic knowledge of the data but know how it is distributed. The object distributor 82 uses the location distributor 78 to control multi-location operations such as replication and synchronization. The consistency distributor 74 manages transaction semantics, such as when it buffers updates made after a call to NdrOdStartTxn( ) and applies them atomically when NdrOdEndTxn( ) is called. The file distributor 90 manages the replication of file contents.

The processors 76, 86, 88, and 92 process requests for the local location 40. The consistency processor 76 handles transaction semantics and synchronization, and uses the transaction logger 88 to log updates to the database. The logged updates are used to synchronize other locations 40 and to provide recovery in the event of a clash or a crash. The logger 88 maintains a compressed transaction log. The log is "compressed," for example, in that multiple updates to the "last time modified" attribute of a file object will be represented by a single update. The logger 88 maintains a short sequential on-disk log of recent transactions; the longer-term log is held in the object database as update log entry objects.

The object processor 86 implements a local object store and supports the following access methods: hierarchical (e.g., add file object under directory object); global indexed (e.g., read any object using its UOID); and local indexed (e.g., read files and directories within a directory in name order). The object processor 86 uses a variant of a B*-tree. The object processor 86 uses a page table to support atomic commitment of transactional updates, providing rollback and protection against crashes of the computer 40.

A file system layer in the file system interface 48 provides a flat file system interface built on the local host file system. It re-maps the flat file system calls to the corresponding files in the hierarchical NetWare volumes to support the current NetWare file system.

Figure 4:
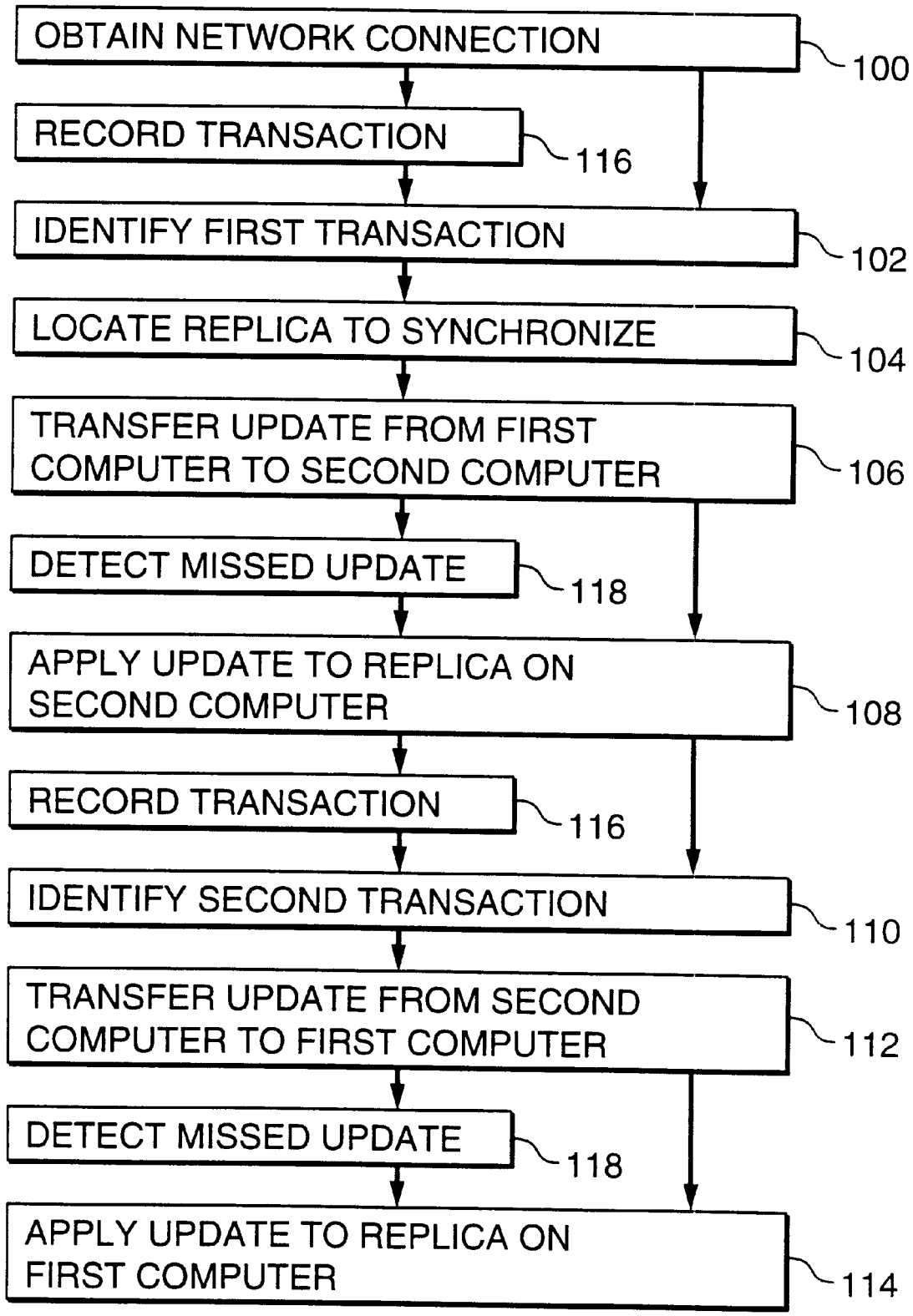
FIG. 4 is a flowchart illustrating transaction synchronization methods of the present invention.

With reference to FIGS. 1 through 4 and particular focus on FIG. 4, a method of the present invention for synchronizing transactions in the network 10 of connectable computers 28 is illustrated. The transactions target entries in a distributed hierarchical database that contains convergently consistent replicas 56 residing on separate computers 28 in the network 10. The method comprises the following computer-implemented steps.

A connecting step 100 uses the replica manager 46 and network link manager 50 to establish a network connection between a first computer 36 and a second computer 38. For purposes of illustrating the method, the first computer 36 shown in FIG. 1 is a client computer 20 and the second computer 38 is a server computer 16. However, a server and a client, or two servers, or two clients, may also be synchronized and otherwise managed according to the present invention.

A first identifying step 102 identifies a first transaction that targets an entry in a first replica on the first computer 36. This may be accomplished using the replica manager 46 described above, and may include intervening in a chain of calls that begins with a file system update request and ends in an operating system request on the first computer 36. A single file system update operation, such as creating a file, is converted into a transaction that involves a set of update operations to the target object database. The first identifying step 102 may also include access to the update log maintained by the transaction logger 88.

The replica may be a replica 56 of a distributed hierarchical database that includes objects and object attributes defined according to the schema 84, which is accessible outside the database. Thus, the database entries may include, without limitation, file and directory entries for a file system and/or Novell directory services entries.

A locating step 104 locates a second replica 56 that resides on the second computer 38 and that corresponds in entries (but not necessarily in entry values) to the first replica 56. This may be accomplished using the replica manager 46 described above, and may include access to the location state processor 80.

A first transferring step 106 transfers an update based on the first transaction over the network connection from the first computer 36 to the second computer 38. The update may include operation and object-identifying information from a log entry, a transaction sequence number corresponding to the first transaction, and a location identifier corresponding to the first computer 36. The first transaction may be one of a plurality of transactions completed at the first computer 36, in which case each completed transaction has a corresponding transaction sequence number.

The transfer may be accomplished in accordance with a SyncUpdate request and the respective consistency distributors 74 of the computers 36, 38. If the contents of a distributed file have been modified, the file distributors 90 on the two computers 36, 38 are also utilized.

A first applying step 108 performed on the second computer 38 atomically applies the first transaction update to the second replica 56. This may be accomplished using the consistency processor 76, object processor 86, transaction processor 88, file system interface 48, and storage device and controller 54 of the second computer 38. The applying step 108 may set a database object lock that serializes updates to the first replica 56, or users may rely on a combination of retries and clash handling as noted above. If file contents are involved, the file processor 92 on the second computer 38 is also utilized.

One method of the present invention includes additional computer-implemented steps. A second identifying step 110 identifies a second transaction that targets an entry in the second replica 56 on the second computer 38. This may be accomplished in a manner similar to the first identifying step 102. A second transferring step 112 transfers an update based on the second transaction over the network connection from the second computer 38 to the first computer 36. This may be accomplished in a manner similar to the first transferring step 106. A second applying step 114 performed on the first computer 36 applies the second transaction update to the first replica 56. This may be accomplished in a manner similar to the first applying step 108.

The identifying step 102 and/or 110 may be preceded by the computer-implemented step of recording the transaction on a non-volatile storage medium using the storage device and controller 54. The recording step may enter a representation of the transaction in a transaction log maintained by the transaction logger 88.

A detecting step 118 may detect a missed update by detecting a gap in a plurality of transferred transaction sequence numbers. To facilitate gap detection, in one embodiment the transaction sequence numbers are consecutive and monotonic for all completed transactions.

Although the invention is illustrated with respect to synchronization of two computers 36, 38, those of skill in the art will appreciate that a more than two computers may also be synchronized. In such cases, additional transferring steps transfer the transaction updates to other computers 28 in the network 10, and additional applying steps apply the transaction updates to replicas 56 on the other computers 28.

In summary the present invention provides a system and method for properly synchronizing transactions when a disconnectable computer 28 is reconnected to the network 10. The invention is not limited to file system operations but can instead be extended to support a variety of database objects by using the schema 84, object distributor 82, object processor 86, and other modules. Clash handling means may be used to identify potentially conflicting database changes and allow their resolution by either automatic or manual means. Clash handling and retries also make locks optional.

The synchronization time period does not depend directly on the total number of files, directories, or other objects in the replica 56. Rather, the required time depends on the number and size of the objects that require updating. This facilitates synchronization over slow links, such as mobile computer modems and WAN server connections. Unlike conventional systems such as state-based systems, the present invention is therefore readily scaled upward to handle larger networks. Moreover, the dynamic intervention and processing of operations by the replica managers 46 allows systems of the present invention to support continuous synchronization across slow links. The replica managers 46 also allow the use of consistent file locations regardless of whether a mobile computer is connected to the network 10.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for synchronizing transactions in a system, the system including at least two computers capable of being connected by a network link, each of the computers including a storage device containing a distributed hierarchical database replica, a device controller in signal communication with the storage device, a replica manager in signal communication with the device controller and the network link, and a database manager in signal communication with the replica manager, the method comprising the computer-implemented steps of:

routing database transactions with the database managers through the replica managers to the device controllers;

connecting at least two computers with the network link; and using each of at least two replica managers to route a transaction to another replica manager after the two computers are connected by the network link.

2. The method of claim 1, further comprising the computer-implemented step of recording a transaction on a non-volatile storage medium.

3. The method of claim 2, wherein said recording step comprises the step of entering a representation of the transaction in a transaction log.

4. The method of claim 1 for synchronizing transactions in the system, the system containing a network of connectable computers, the transactions targeting entries in the distributed hierarchical database replicas, the replicas residing on separate computers in the network, said method comprising the steps of:

obtaining a network connection between a first computer and a second computer as part of said step of connecting at least two computers with the network link;

identifying a first transaction that targets a distributed hierarchical database entry in a first replica on the first computer, as part of said step of routing database transactions; and as part of said step of using each of at least two replica managers, locating a corresponding second replica that resides on the second computer, transferring an update based on the first transaction over the network connection from the first computer to the second computer, and applying the first transaction update to the second replica.

5. The method of claim 4, wherein the replicas contain file descriptors and directory descriptors for a file system.

6. The method of claim 4, wherein the replicas contain directory services entries.

7. The method of claim 4, wherein said step of transferring an update comprises transferring a transaction sequence number corresponding to the first transaction and a location identifier corresponding to the first computer.

8. The method of claim 7, wherein the first transaction is one of a plurality of transactions completed at the first computer and each completed transaction has a corresponding transaction sequence number.

9. The method of claim 8, wherein the transaction sequence numbers are generated in a predetermined order.

10. The method of claim 9, wherein the transaction sequence numbers are consecutive and monotonic for all completed transactions.

11. The method of claim 8, further comprising the computer-implemented step of detecting a missed update by detecting a gap in a plurality of transferred transaction sequence numbers.

12. The method of claim 7, wherein the first transaction is one of a plurality of transactions completed at the first computer, each completed transaction has a corresponding transaction sequence number, and the transaction sequence numbers are consecutive and monotonic for all completed transactions.

13. The method of claim 12, further comprising the computer-implemented step of detecting a missed update by detecting a gap in a plurality of transferred transaction sequence numbers.

14. The method of claim 4, wherein said transferring step further comprises transferring the first transaction update to at least one computer other than the first and second computers, and said applying step further comprises applying the first transaction update to at least one replica other than the first and second replicas.

15. The method of claim 4, wherein said applying step comprises setting a database object lock that serializes updates to the first replica.

16. The method of claim 4, wherein said applying step comprises applying the first transaction to the second replica atomically.

17. A system comprising at least two computers capable of being connected by a network link, each of said computers comprising:
   a storage device containing a replica, said replica containing entries of a distributed hierarchical database;
   a device controller in signal communication with said storage device;
   a replica manager in signal communication with said device controller and said network link; and
   a database manager in signal communication with said replica manager, said database manager on each computer configured to route database transactions to said device controller only through said replica manager, and said replica managers configured to route such transactions to each other after said computers are connected by said network link.

18. The system of claim 17, wherein each of said replica managers comprises a replica distributor and a replica processor.

19. The system of claim 18, wherein said replica distributor comprises a consistency distributor and a location distributor.

20. The system of claim 18, wherein said replica distributor comprises a consistency distributor, a location distributor, an object distributor, and an object schema.

21. The system of claim 20, wherein said replica distributor further comprises a file distributor.

22. The system of claim 18, wherein said replica processor comprises a consistency processor and a location state processor.

23. The system of claim 18, wherein said replica processor comprises a consistency processor, a location state processor, an object processor, and a transaction logger.

24. The system of claim 23, wherein said replica processor further comprises a file processor.

25. The system of claim 17, wherein said replica manager comprises trigger function registrations, each registration associating a registered trigger function with a database operation such that the registered trigger function will be invoked on each replica, once the computers are connected, if the associated operation is requested of the database manager.

26. The system of claim 25, wherein the associated operation belongs to the group consisting of add, remove, modify, and move operations.

27. The system of claim 17, wherein said replicas contain file descriptors and directory descriptors for a file system.

28. The system of claim 17, wherein said replicas contain directory services entries.

29. A computer-readable storage medium having a configuration that represents data and instructions which cause a first computer and a second computer in a system to perform method steps for synchronizing transactions, the system including at least two computers capable of being connected by a network link, each of the computers including a storage device containing a distributed hierarchical database replica, a device controller in signal communication with the storage device, a replica manager in signal communication with the device controller and the network link, and a database manager in signal communication with the replica manager, the method comprising the steps of:
   routing database transactions with the database managers through the replica managers to the device controllers;
   connecting at least two computers with the network link; and
   using each of at least two replica managers to route a transaction to another replica manager after the two computers are connected by the network link by:
      identifying a first transaction that targets an entry in the first replica, which resides on the first computer;
      transferring an update based on the first transaction over the network connection from the first computer to the second computer;
      applying the first transaction update to the second replica, which resides on the second computer;
      identifying a second transaction that targets an entry in the second replica;
      transferring an update based on the second transaction over the network connection from the second computer to the first computer; and
      applying the second transaction update to the first replica.

30. The storage medium of claim 29, wherein the method further comprises the step of entering a representation of a transaction in a transaction log.

31. The storage medium of claim 29, wherein the distributed hierarchical database includes objects and object attributes defined according to a schema that is accessible outside the database.

32. The storage medium of claim 29, wherein the replicas contain file descriptors and directory descriptors for a file system.

33. The storage medium of claim 29, wherein the replicas contain directory services entries.

34. The storage medium of claim 29, wherein the step of transferring an update comprises transferring a transaction sequence number corresponding to the first transaction and a location identifier corresponding to the first computer.

* * * * *